(12) United States Patent
Shiraishi

(10) Patent No.: US 8,081,242 B2
(45) Date of Patent: Dec. 20, 2011

(54) IMAGING APPARATUS AND IMAGING METHOD

(75) Inventor: Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 332 days.

(21) Appl. No.: 12/542,023

(22) Filed: Aug. 17, 2009

(65) Prior Publication Data

US 2010/0045814 A1    Feb. 25, 2010

(30) Foreign Application Priority Data

Aug. 20, 2008  (JP) ................... 2008-211894
May 15, 2009   (JP) ................... 2009-118495

(51) Int. Cl.
*H04N 9/64*    (2006.01)
(52) U.S. Cl. ..................... 348/256; 348/222.1
(58) Field of Classification Search ............. 348/222.1, 348/223.1, 256, 272–273, 234
See application file for complete search history.

(56) References Cited

U.S. PATENT DOCUMENTS

| | | | |
|---|---|---|---|
| 7,336,302 B2 * | 2/2008 | Kuroiwa .................. 348/237 |
| 7,397,502 B2 | 7/2008 | Shiraishi | |
| 7,471,321 B2 | 12/2008 | Ojima et al. | |
| 7,884,866 B2 * | 2/2011 | Yamada et al. .............. 348/280 |
| 2003/0147000 A1 | 8/2003 | Shiraishi | |
| 2004/0252224 A1 | 12/2004 | Shiraishi et al. | |
| 2005/0062854 A1 | 3/2005 | Shiraishi | |
| 2005/0134700 A1 | 6/2005 | Shiraishi | |
| 2005/0151874 A1 | 7/2005 | Shiraishi | |
| 2005/0168620 A1 | 8/2005 | Shiraishi | |
| 2007/0216951 A1 | 9/2007 | Shiraishi | |
| 2009/0047010 A1 | 2/2009 | Yoshida et al. | |
| 2009/0073282 A1 | 3/2009 | Yamada et al. | |
| 2009/0180000 A1 | 7/2009 | Shiraishi | |
| 2011/0001841 A1 * | 1/2011 | Shiraishi et al. .......... 348/223.1 |

FOREIGN PATENT DOCUMENTS

| | | |
|---|---|---|
| JP | 4245699 A | 9/1992 |
| JP | 10-262182 A | 9/1998 |
| JP | 2003-309857 A | 10/2003 |
| JP | 2003-324656 A | 11/2003 |
| JP | 2006-333113 A | 12/2006 |
| JP | 2006-339761 A | 12/2006 |
| JP | 2007-082180 A | 3/2007 |
| JP | 2007-194971 A | 8/2007 |
| JP | 4245699 B2 | 1/2009 |
| WO | WO-2009/035148 A1 | 3/2009 |

* cited by examiner

*Primary Examiner* — Tuan Ho
(74) *Attorney, Agent, or Firm* — Dickstein Shapiro LLP

(57) ABSTRACT

An imaging apparatus, includes: an image sensor having a light receiving surface with a plurality of pixels and a plurality-of-color separation filter, which receives light from a photographic subject which is incident via an optical system on the surface via the filter, outputs a pixel output of each pixel, and images an image of the subject; a pixel output judging section which judges if each pixel output reaches each predetermined saturation level or not; a pixel output compensation processor which compensates a pixel output of a specific color filter based on a pixel output of another color separation filter in the vicinity which is less than its predetermined saturation level; and a bit compression convertor.

20 Claims, 17 Drawing Sheets

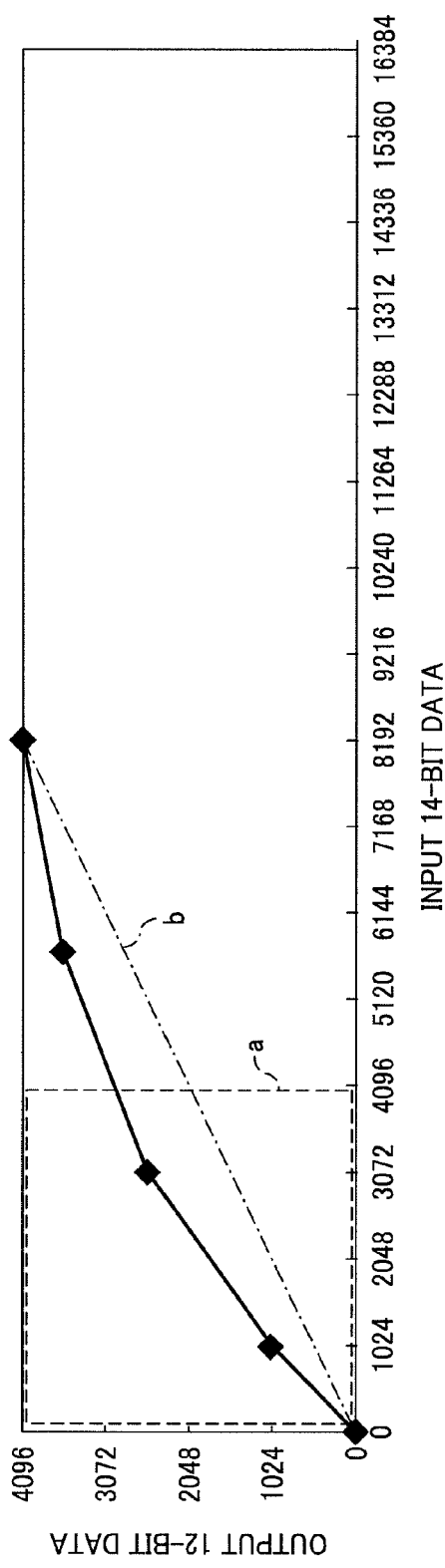
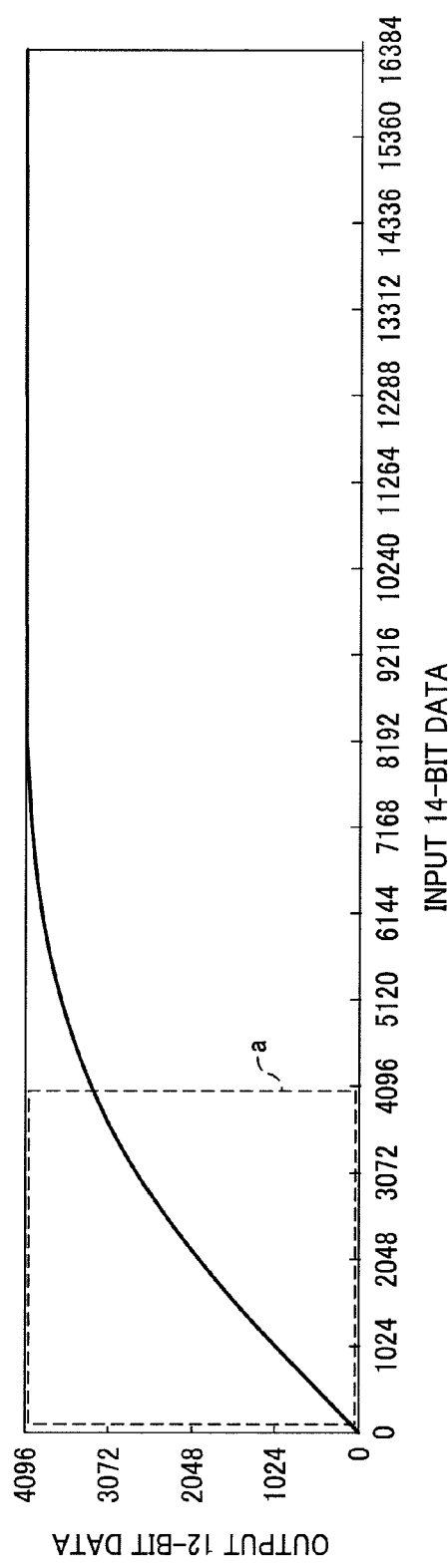

FIG. 14

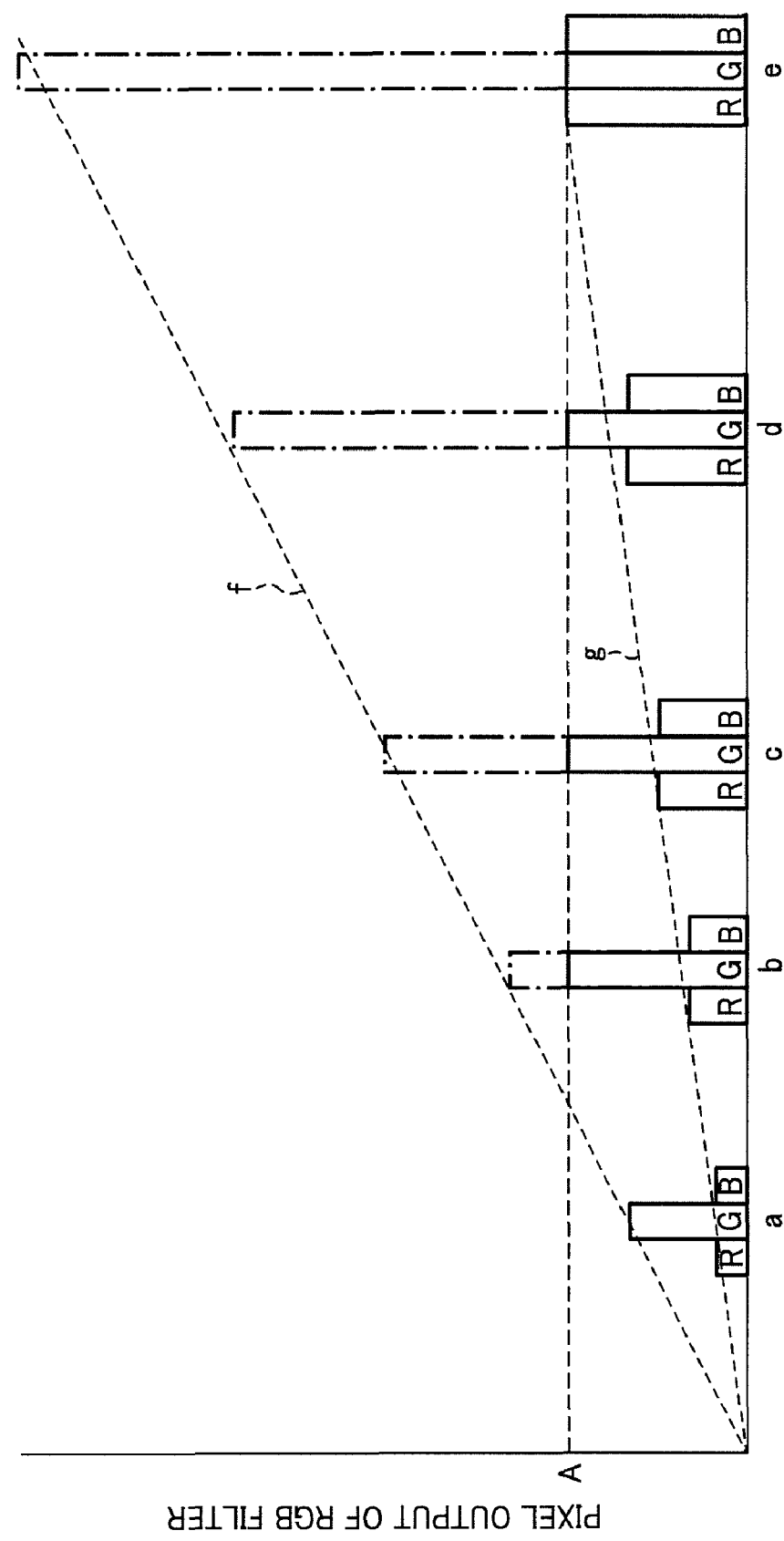

IMAGING APPARATUS AND IMAGING METHOD

CROSS REFERENCE TO RELATED APPLICATIONS

The present invention is based on and claims priority from Japanese Patent Application Numbers 2008-211894, filed Aug. 20, 2008, and 2009-118495, filed May 15, 2009, the disclosures of which are hereby incorporated by reference herein in their entireties.

BACKGROUND

The present invention relates to an imaging apparatus such as a digital still camera and a digital video camera, and to an imaging method. Especially, the present invention relates to an imaging apparatus which is capable of expanding a dynamic range of a shooting image and an imaging method therefor.

A dynamic range of an image shot by a digital still camera, a digital video camera, and the like having a solid-state image sensor such as a CCD is far narrower than a dynamic range of an image shot by a traditional silver-halide camera using silver-halide photography film. In a case where the dynamic range is narrow, "a blackout" occurs in a dark area of a photographic subject and "a whiteout" occurs in a bright area of the photographic subject, and thereby image quality becomes lower.

In order to expand the dynamic range of the image imaged by the solid-state image sensor such as the CCD, for example, Japanese Patent No. 4245699 discloses a technique in which a plurality of shootings is performed with different exposure amounts on the same photographic subject, a plurality of different exposure-amount images is obtained, and then these images are put together to produce a composite image with an expanded dynamic range.

However, in a case where a photographic subject is a moving object and is shot by a method of expanding the dynamic range as disclosed in Japanese Patent No. 4245699 above, double-images are often obtained and thereby a composite image with an expanded dynamic range is not produced successfully.

SUMMARY

An object of the present invention is to provide an imaging apparatus which is capable of expanding a dynamic range at one shooting, without performing a plurality of shootings with different exposure amounts, and producing a composite image with an expanded dynamic range, and to provide an imaging method therefor.

To achieve an object of the present invention, an embodiment of the present invention provides: an imaging apparatus, comprising: an image sensor having a light receiving surface with a plurality of pixels and a color separation filter of a plurality of colors placed on a front side of the pixels, which receives light from a photographic subject which is incident via an optical system on the light receiving surface via the color separation filter, outputs a pixel output of each pixel, and images an image of the photographic subject; a pixel output judging section which judges if each pixel output reaches each predetermined saturation level or not; a pixel output compensation processor which performs a compensating process that calculates a pixel output of a pixel where a color separation filter of a specific color is placed, and expands a dynamic range of the image which the image sensor images, based on a pixel output of a pixel where another color separation filter is placed in a vicinity of the pixel where the color separation filter of the specific color is placed and the pixel output of the pixel where the another color separation filter is placed is less than its predetermined saturation level; and a bit compression convertor which has a bit compression conversion characteristic in which a data compression rate of a pixel output for brightness where the pixel output of the pixel where the color separation filter of the specific color is placed is less than its predetermined saturation level is smaller than a data compression rate of the pixel output for brightness where the pixel output of the pixel where the color separation filter of the specific color is placed reaches its predetermined saturation level, and converts data of the pixel output converted to a second bit number which is larger than a first bit number from the first bit number to the first bit number again based on the bit compression conversion characteristic.

Preferably, the compensating process is performed in a case where the pixel output judging section judges that the pixel output of the pixel where the color separation filter of the specific color is placed reaches its predetermined saturation level.

Preferably, in a case where the pixel output of the pixel where the another color separation filter is placed in the vicinity of the pixel where the color separation filter of the specific color is placed exceeds a predetermined output level, the pixel output compensation processor performs the compensating process.

Preferably, in a case where the pixel output judging section judges the pixel output, a processing unit is an area comprising 2×2 pixels in horizontal and vertical directions.

Preferably, in a case where there are a plurality of pixels where same color filters are placed in a predetermined range, a value of the pixel output where the same color filters are placed is an average value of the pixels where the same color filters are placed.

Preferably, on an optical axis of the optical system, a color filter of a same color as the color separation filter of the specific color which is movable is provided, so that a sensitivity of the another color separation filter is relatively lowered compared to a sensitivity of the color separation filter of the specific color.

Preferably, plural pieces of the color filter are provided and each color filter has a different light transmission rate.

Preferably, the imaging apparatus, further comprises: an operation selector which is configured to select and execute the compensating process.

Preferably, the bit compression conversion characteristic has a compression rate such that data of the pixel output before converting is an approximately same value as data of the pixel output after converting, in a case of brightness such that the pixel output of the pixel where the color filter of the specific color is placed becomes less than its predetermined saturation level and is low.

Preferably, in a case where the pixel output of the color separation filter of the specific color after the compensating process is larger than the pixel output before the compensating process, the pixel output compensation processor uses the pixel output after the compensating process as the pixel output of the color separation filter of the specific color.

To achieve an object of the present invention, an embodiment of the present invention provides: an imaging method, comprising: a step of preparing an imaging apparatus, including: an image sensor having a light receiving surface with a plurality of pixels and a color separation filter of a plurality of colors placed on a front side of the pixels, which receives light from a photographic subject which is incident via an optical system on the light receiving surface via the color separation filter, outputs a pixel output of each pixel, and images an image of the photographic subject; a step of a pixel output judgment which judges if each pixel output reaches each predetermined saturation level or not; a step of a pixel output compensation process which performs a compensating process that calculates a pixel output of a pixel where a color separation filter of a specific color is placed, and expands a dynamic range of the image which the image sensor images, based on a pixel output of a pixel where another color separation filter is placed in a vicinity of the pixel where the color separation filter of the specific color is placed and the pixel output of the pixel where the another color separation filter is placed is less than its predetermined saturation level; and a step of a bit compression conversion which has a bit compression conversion characteristic in which a data compression rate of a pixel output for brightness where the pixel output of the pixel where the color separation filter of the specific color is placed is less than its predetermined saturation level is smaller than a data compression rate of the pixel output for brightness where the pixel output of the pixel where the color separation filter of the specific color is placed reaches its predetermined saturation level, and converts data of the pixel output converted to a second bit number which is larger than a first bit number from the first bit number to the first bit number again based on the bit compression conversion characteristic.

Preferably, the compensating process is performed in a case where the step of the pixel output judgment judges that the pixel output of the pixel where the color separation filter of the specific color is placed reaches its predetermined saturation level.

Preferably, in a case where the pixel output of the pixel where the another color separation filter is placed in the vicinity of the pixel where the color separation filter of the specific color is placed exceeds a predetermined output level, the step of the pixel output compensation process performs the compensating process.

Preferably, in a case where the step of the pixel output judgment judges the pixel output, a processing unit is an area comprising 2×2 pixels in horizontal and vertical directions.

Preferably, in a case where there are a plurality of pixels where same color filters are placed in a predetermined range, a value of the pixel output where the same color filters are placed is an average value of the pixels where the same color filters are placed.

Preferably, on an optical axis of the optical system, a color filter of a same color as the color separation filter of the specific color which is movable is provided, so that a sensitivity of the another color separation filter is relatively lowered compared to a sensitivity of the color separation filter of the specific color.

Preferably, plural pieces of the color filter are provided and each color filter has a different light transmission rate.

Preferably, the imaging method, further comprises: a step of preparing an operation selector which is configured to select and execute the compensating process.

Preferably, the bit compression conversion characteristic has a compression rate such that data of the pixel output before converting is an approximately same value as data of the pixel output after converting, in a case of brightness such that the pixel output of the pixel where the color filter of the specific color is placed becomes less than its predetermined saturation level and is low.

Preferably, in a case where the pixel output of the color separation filter of the specific color after the compensating process is larger than the pixel output before the compensating process, the step of the pixel output compensation process uses the pixel output after the compensating process as the pixel output of the color separation filter of the specific color.

BRIEF DESCRIPTION OF THE DRAWINGS

FIG. 11A illustrates a conversion characteristic which compresses expanded 14-bit data of a pixel output of a G filter to 12-bit data in embodiment 1 of the present invention.

FIG. 11B illustrates a conversion characteristic which compresses expanded 14-bit data of a pixel output of a G filter to 12-bit data in another example of embodiment 1 of the present invention.

FIG. 14 illustrates an arrangement position and a processing unit of an RGB filter in embodiment 2 of the present invention.

FIG. 18 illustrates a principle of a dynamic range expansion in embodiment 4 of the present invention.

BRIEF DESCRIPTION OF THE PREFERRED EMBODIMENTS

Hereinafter, with reference to the drawings, embodiments of the present invention will be explained.

Embodiment 1

Figure 1A:
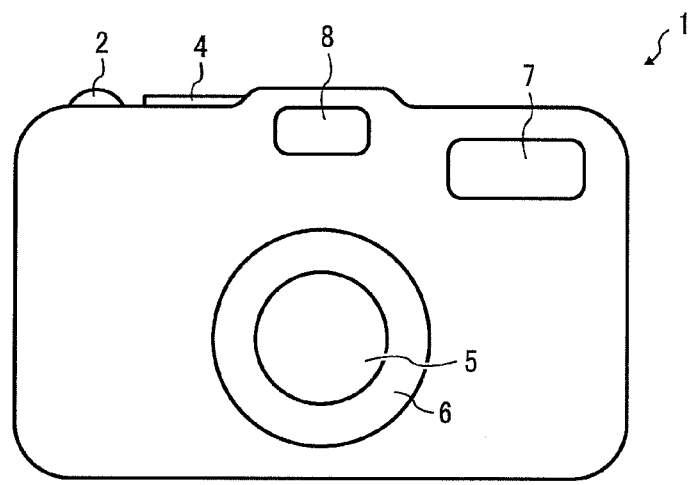
FIG. 1A is a front view of a digital camera as an example of an imaging apparatus according to embodiments 1 to 6 of the present invention.
Figure 1B:
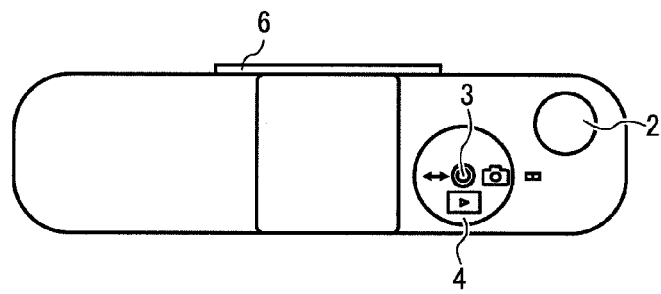
FIG. 1B is a top view of the digital camera as an example of the imaging apparatus according to embodiments 1 to 6 of the present invention.
Figure 1C:
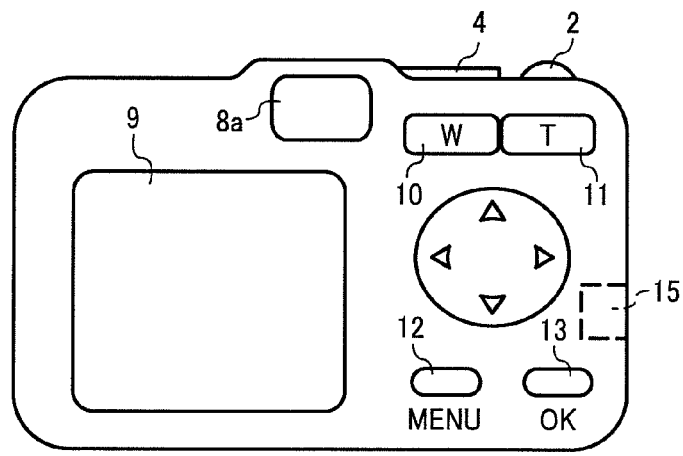
FIG. 1C is a back view of the digital camera as an example of the imaging apparatus according to embodiments 1 to 6 of the present invention.
Figure 2:
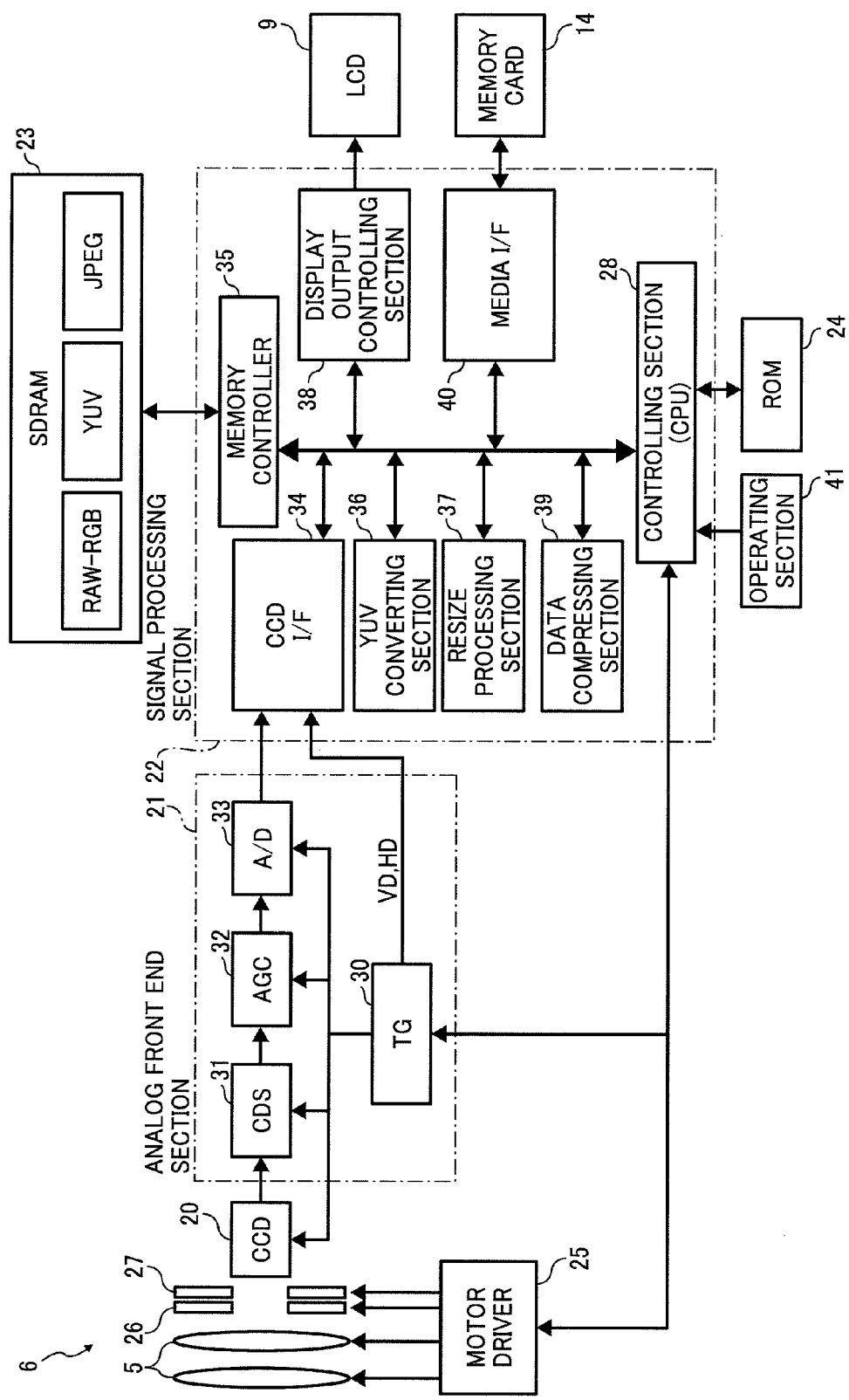
FIG. 2 is a schematic block diagram illustrating a system configuration in the digital camera as an example of the imaging apparatus according to embodiments 1 to 6 of the present invention.

FIG. 1A is a front view, FIG. 1B is a top view, and FIG. 1C is a back view of a digital still camera (hereinafter, it is called a "digital camera") as an example of an imaging apparatus according to embodiment 1 of the present invention. FIG. 2 is a schematic block diagram illustrating a system configuration in the digital camera illustrated in FIGS. 1A to 1C.

(External Appearance Configuration of a Digital Camera)

As illustrated in FIGS. 1A to 1C, on a top side of the digital camera 1 according to the present embodiment, a shutter release button (shutter button) 2, a power button 3, and a shooting/playback switch dial 4 are provided. On a front side of the digital camera 1, a lens barrel unit 6 having a photographing lens system 5 (an optical system), a stroboscopic light emitting section (flash) 7, and an optical viewfinder 8 are provided.

On a back side of the digital camera 1, a liquid crystal display (LCD) monitor 9, an eyepiece lens section 8a of the optical viewfinder 8, a wide angle zoom (W) switch 10, a telephoto zoom (T) switch 11, a menu (MENU) button 12 (an operation selector), a confirmation (OK) button 13 and so on are provided. Additionally, inside a side of the digital camera 1, a memory card storing section 15 is provided. The memory card storing section 15 stores a memory card 14 (see FIG. 2) which stores shot image data.

(System Configuration of the Digital Camera)

As illustrated in FIG. 2, the digital camera 1 has a CCD (Charge-Coupled Device) 20 as a solid-state image sensor, an analog front end section 21 (hereinafter, it is called an "AFE section."), a signal processing section 22, an SDRAM (Synchronous Dynamic Random Access Memory) 23, a ROM (Read Only Memory) 24, a motor driver 25 and so on. The CCD 20 as the solid-state image sensor images light from a photographic subject which is incident via the photographing lens system 5 of the lens barrel unit 6 on a light receiving surface as an image of the photographic subject. The AFE section 21 converts an electric signal (an analog RGB image signal) outputted from the CCD 20 into a digital signal. The signal processing section 22 processes a digital signal outputted from the AFE section 21. The SDRAM 23 temporarily stores data. A control program and so on are kept in the ROM 24. The motor driver 25 drives the lens barrel unit 6.

The lens barrel unit 6 comprises the photographing lens system 5, an aperture unit 26, and a mechanical shutter unit 27. The photographing lens system 5 has a zoom lens, a focus lens and so on. Each driver unit of the photographing lens system 5, the aperture unit 26, and the mechanical shutter unit 27 is driven by the motor driver 25. The motor driver 25 is driven and controlled by a driving signal from a controlling section (CPU, Central Processing Unit) 28 of the signal processing section 22.

The CCD 20 comprises a plurality of pixels. An RGB primary-color filter (see FIG. 7: hereinafter, it is called an "RGB filter.") is placed on the plurality of pixels. The CCD 20 outputs an electric signal (an analog RGB image signal) corresponding to RGB, three primary colors.

The AFE section 21 comprises a TG (a timing signal generating section) 30, a CDS (a correlated double sampling section) 31, an AGC (an analog gain controlling section) 32, and an A/D converting section (an analog/digital converting section) 33. The TG 30 drives the CCD 20. The CDS 31 samples the electric signal (the analog RGB image signal) which is outputted from the CCD 20. The AGC 32 adjusts a gain of the image signal which is sampled in the CDS 31. The A/D converting section 33 converts the image signal which is gain-adjusted in the AGC 32 into a digital signal (hereinafter, it is called "RAW-RGB data").

The signal processing section 22 comprises a CCD interface (hereinafter, it is called a "CCD I/F") 34, a memory controller 35, a YUV converting section 36, a resize processing section 37, a display output controlling section 38, a data compressing section 39, a media interface (hereinafter, it is called a "media I/F") 40, and the controlling section (CPU) 28. The CCD I/F 34 receives outputs of a picture horizontal synchronizing signal (HD), a picture vertical synchronizing signal (VD) and a pixel transfer clock (pixel clock) from the TG 30 of the AFE section 21, and loads RAW-RGB data which is outputted from the A/D converting section 33 of the AFE section 21 synchronizing with these synchronizing signals. The memory controller 35 controls the SDRAM 23. The YUV converting section 36 converts the loaded RAW-RGB data into image data in YUV format which is displayable and recordable. The resize processing section 37 changes a size of an image corresponding to the size of the image data which is displayed or recorded. The display output controlling section 38 controls a display output of the image data. The data compressing section 39 records the image data in JPEG format and so on. The media I/F 40 writes the image data in the memory card 14 and reads out the image data written in the memory card 14. The controlling section (CPU) 28 performs a whole system control of the digital camera 1 and so on by the control program kept in the ROM 24 based on operating information inputted from an operating section 41.

The operating section 41 comprises the shutter release button 2, the power button 3, the shooting/playback switch dial 4, the wide angle zoom switch 10, the telephoto zoom switch 11, the menu (MENU) button 12, the confirmation (OK) button 13 and the like on an external surface of the digital camera 1 (see FIGS. 1A to 1C). A predetermined operation indicating signal is inputted to the controlling section 28 by an operation of a user.

In the SDRAM 23, the RAW-RGB data loaded in the CCD I/F 34, YUV data (image data in YUV format) which is converted in the YUV converting section 36, additionally, image data in JPEG format which is compressed in the data compressing section 39 and so on are stored.

Y in YUV is brightness data. U and V in the YUV provide color information. The U is a color difference between brightness data and blue data (B), and the V is a color difference between brightness data and red data (R). The YUV is a format in which colors are expressed by these three, the Y, U, and V.

(Monitoring (Live-preview) Operation and Still Image Shooting Operation of the Digital Camera)

Next, a monitoring operation and a still image shooting operation of the digital camera 1 will be explained. In a still image shooting mode, the digital camera 1 performs the still image shooting operation while the monitoring operation as described below is performed.

Firstly, the power button 3 is turned on by a user, the shooting/playback switch dial 4 is set to a shooting mode, and then the digital camera 1 starts operating in a recording mode. When the controlling section 28 detects that the power button 3 is turned on and the shooting/playback switch dial 4 is set to the shooting mode, the controlling section 28 outputs a control signal to the motor driver 25 to move the lens barrel unit 6 to a position where shooting is possible and to start operating the CCD 20, the AFE section 21, the signal processing section 22, the SDRAM 23, the ROM 24, the LCD monitor 9 and the like.

The photographing lens system 5 of the lens barrel unit 6 is aimed at a photographic subject, and thereby light from the photographic subject which is incident via the photographing lens system 5 is imaged on a light receiving surface of each pixel of the CCD 20 as an image of the photographic subject. And an electric signal corresponding to the image of the photographic subject outputted from the CCD 20 (an analog RGB image signal) is inputted to the A/D converting section 33 via the CDS 31 and the AGC 32, and then the electric signal is converted into 12-bit RAW-RGB data by the A/D converting section 33.

This RAW-RGB data is loaded to the CCD I/F 34 of the signal processing section 22 and is stored in the SDRAM 23 via the memory controller 35. And after the RAW-RGB data which is read out from the SDRAM 23 is converted into YUV data (YUV signal), which is a displayable format, in the YUV converting section 36, the YUV data is stored in the SDRAM 23 via the memory controller 35.

The YUV data which is read out from the SDRAM 23 via the memory controller 35 is transmitted to the LCD monitor 9 via the display output controlling section 38, and a photographic subject image (moving image) is displayed. When monitoring the photographic subject image which is displayed on the LCD monitor 9, image data of the photographic subject for one frame is read out at 1/30 second (i.e. 30 fps) by the CCD I/F 34.

When this monitoring operation is performed, it is in a state where the photographic subject image is only displayed on the LCD monitor 9 functioning as an electric viewfinder, and the shutter release button 2 is not yet pressed (and not half-pressed, either).

It is possible for the user to check the photographic subject image by displaying the photographic subject image on the LCD monitor 9. In addition, the display output controlling section 38 outputs a TV video signal, and the photographic subject image (moving image) is also displayed on an external TV (television) via a video cable.

The CCD I/F 34 of the signal processing section 22 calculates an AF (Auto Focus) evaluation value, an AE (Auto Exposure) evaluation value, and AWB (Auto White Balance) evaluation value by the RAW-RGB data which is loaded.

The AF evaluation value is calculated by, for example, an output integral value of a high frequency component extraction filter and an integral value of brightness difference between adjacent pixels. In a focusing state, an edge part of the photographic subject is clear, and the high frequency component is highest. By use of this, in a case where the AF operation is performed (when a focus position detection operation is performed), AF evaluation values in each focus lens position of the photographing lens system 5 are obtained, and a maximum value among them is taken as a focus position detected position, and then the AF operation is performed.

The AE evaluation value and the AWB evaluation value are calculated from each additional value of an RGB value of the RAW-RGB data. For example, an image plane corresponding to the light receiving surface of entire pixels of the CCD 20 is equally divided into 256 segments (16 horizontal segments and 16 vertical segments), and an RGB value of each segment is added.

The controlling section 28 reads out an RGB additional value which is calculated. In an AE operation, brightness of each segment of the image plane is calculated, and an appropriate exposure amount is determined by a distribution of brightness. An exposure condition (the number of releases of the electric shutter of the CCD 20, an aperture value of the aperture unit 26 and the like) is set based on the determined exposure amount. In an AWB operation, a control value of the AWB corresponding to a color of a light source of the photographic subject is determined based on a distribution of RGB. This AWB operation adjusts a white balance when the RAW-RGB data is converted into the YUV data in the YUV converting section 36. The AE operation and the AWB operation are continuously performed while the monitoring operation is performed.

While the monitoring operation described above is performed, if a still image shooting operation in which the shutter release button 2 is pressed (from half-pressed to fully-pressed) is started, the AF operation which is the focus position detecting operation and a still image recording operation are performed.

That is, when the shutter release button 2 is pressed (from half-pressed to fully-pressed), a focus lens of the photographing lens system 5 is moved by a drive command from the controlling section 28 to the motor driver 25, and for example, the AF operation of a contrast evaluation system, which is a so-called "hill-climbing AF", is performed.

In a case where the AF (focus) coverage is an entire area from infinity to the closest, the focus lens of the photographing lens system 5 is moved in a distance from the closest to infinity or the distance from infinity to the closest, and the controlling section 28 reads out the AF evaluation value in each focus lens position which is calculated in the CCD I/F 34. And the focus lens is moved to the focus position where the AF evaluation value of each focus lens position is maximum, and the AF operation is achieved.

Then the AE operation described above is performed. When completing an exposure, the mechanical shutter unit 27 is closed by a drive command from the controlling section 28 to the motor driver 25, and an analog RGB image signal for a still image is outputted from the CCD 20. And the analog RGB image signal for the still image is converted into RAW-RGB data in the A/D converting section 33 of the AFE section 21 as well as when monitoring as described above.

This RAW-RGB data is loaded into the CCD I/F 34 of the signal processing section 22, and is converted into YUV data in the YUV converting section 36, which is described later, and then is stored in the SDRAM 23 via the memory controller 35. This YUV data is read out from the SDRAM 23, and is converted into a suitable size corresponding to the number of recording pixels in the resize processing section 37, and then is compressed into image data in JPEG format and so on in the data compressing section 39. After this compressed image data in JPEG format and so on is restored in the SDRAM 23, this compressed image data is read out from the SDRAM 23 via the memory controller 35, and then is stored in the memory card 14 via the media I/F 41.

(Dynamic Range Expanding Process by the YUV Converting Section 36)

The YUV converting section 36 of the digital camera 1 according to the present embodiment has a dynamic range expansion processing function to expand a dynamic range.

On each pixel comprising the CCD 20 of the digital camera 1, an RGB filter (see FIG. 7) of Bayer arrangement is placed. In a general RGB filter, with respect to light which has a wide wavelength range such as sunlight, a sensitivity to brightness of each color, R (red), G (green), and B (blue) is different.

Figure 3:
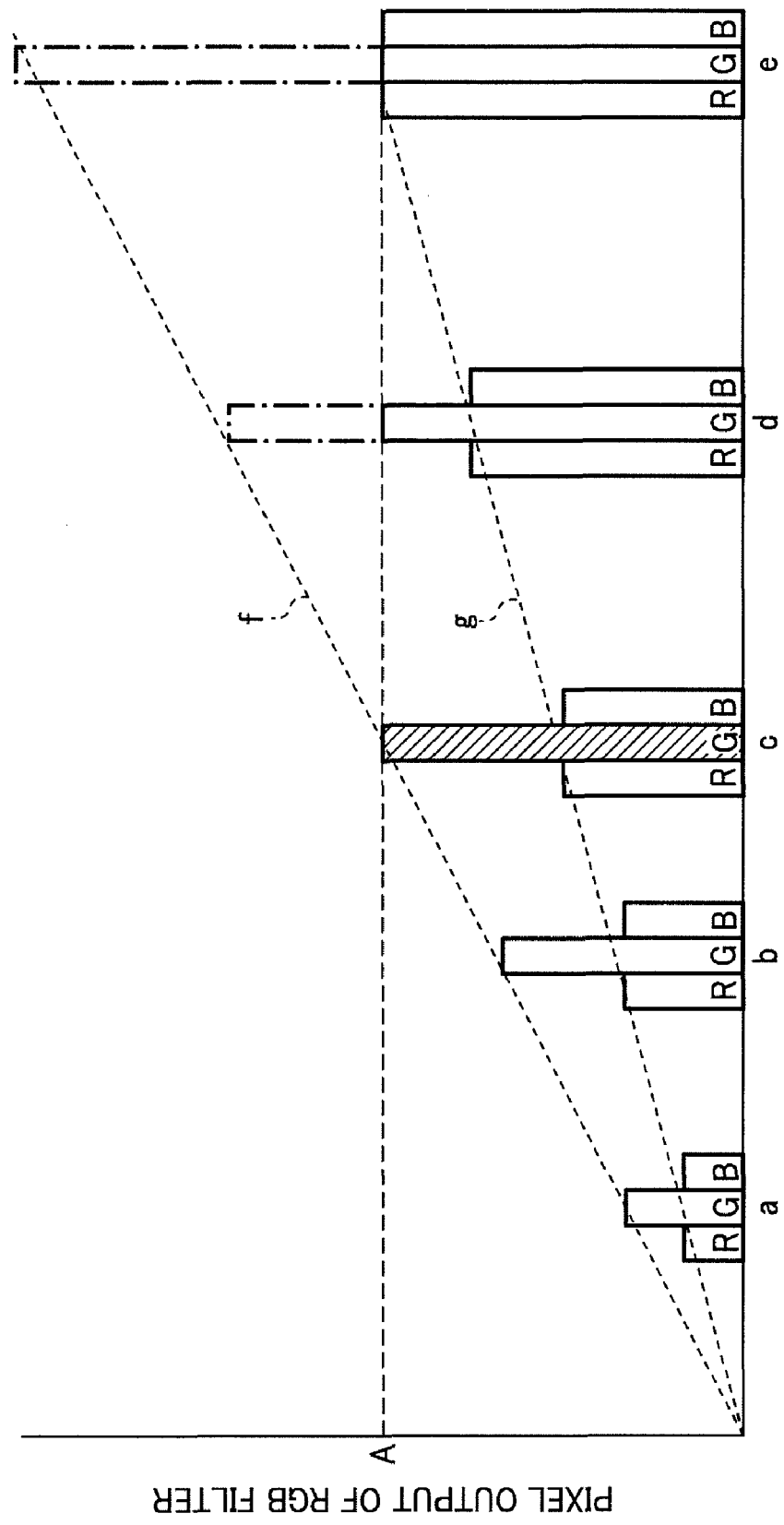
FIG. 3 is an explanatory view illustrating a principle of expanding a dynamic range in embodiment 1 of the present invention.

For example, as illustrated in FIG. 3, in a case where the CCD 20 has an RGB filter ("a", "b", and "c" in FIG. 3) with a sensitivity in which a sensitivity of a G (green) filter is approximately twice as high as sensitivities of R (red) and B (blue) filters, when the same amount of light, which has a wide wavelength range such as sunlight, is incident on the RGB filter, a pixel output of the G filter (a shaded part of "c" in FIG. 3) reaches a saturation level A (a dashed line A) earlier, compared to each pixel output of the R and B filters. In FIG. 3, a dotted-line "f" illustrates a pixel sensitivity characteristic of the G filter and a dotted-line "g" illustrates each pixel sensitivity characteristic of the R and B filters. The pixel sensitivity characteristic of the G filter has approximately a twofold sensitivity compared to each pixel sensitivity characteristic of the R and B filters.

Incidentally, in a digital camera including a solid-state image sensor such as a CCD and the like having a general RGB filter, as the RGB filter of the "a", "b", and "c" in FIG. 3, a range of the dynamic range is set corresponding to the saturation level A of the pixel output of the G filter which has a high sensitivity. That is, in a case where the pixel output of the G filter reaches the saturation level A, the pixel output of the R and B filters is approximately a half (½) of the saturation level A.

On the other hand, in the present invention, as the RGB filters of "d" and "e" in FIG. 3, if the pixel output of the G filter exceeds the saturation level A, when each pixel output of the R and B filters is within each saturation level, from each pixel output level of the R and B filters, on the basis of each pixel sensitivity characteristic of the R and B filters (the dotted-line "g" in FIG. 3) and the pixel sensitivity characteristic of the G filter (the dotted-line "f" in FIG. 3), the pixel output of the G filter is compensated (dash-dot line parts in FIG. 3) so as to expand the dynamic range corresponding to only an amount which is compensated as described above.

Hereinafter, a dynamic range expanding process according to the present embodiment will be explained.

Figure 4:
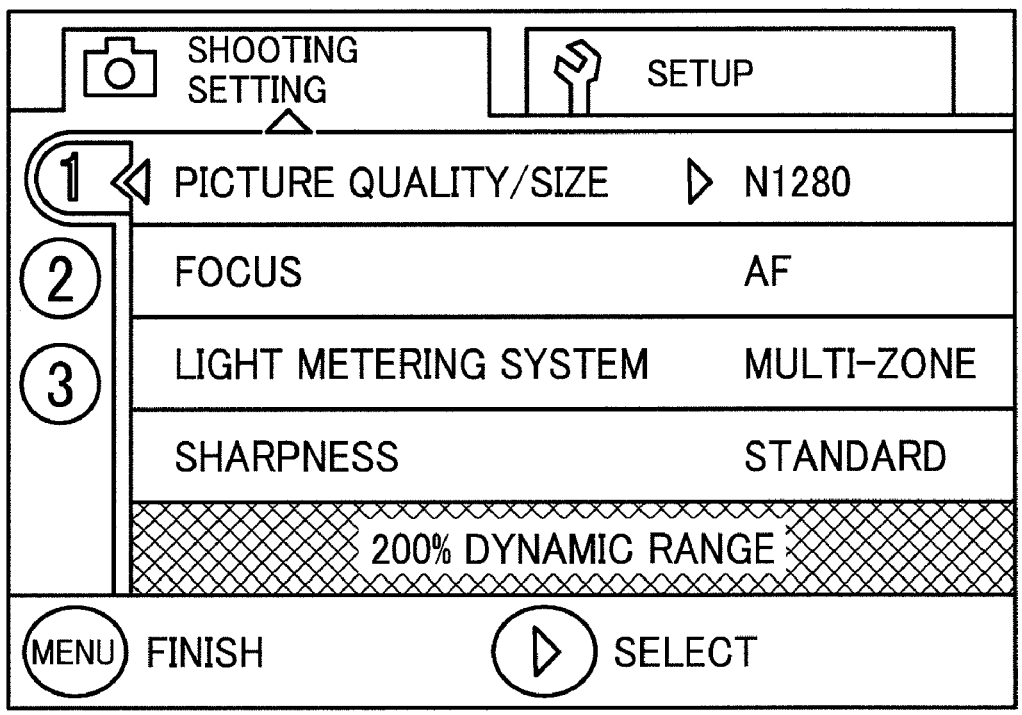
FIG. 4 illustrates an example of a shooting setting screen displayed on an LCD (Liquid Crystal Display) monitor.

In the present embodiment, when the menu (MENU) button 12 (see FIG. 1C) is pressed by the user, and then, for example, a shooting setting screen as illustrated in FIG. 4 appears on the LCD monitor 9. By selecting an item of "200% dynamic range" on the screen, a control signal is outputted from the controlling section 28 to the YUV converting section 36 and the dynamic range expanding process to double the dynamic range is performed.

For example, in a case where there is an extremely bright part in a part of a background of a photographic subject and so on, when the user presses the menu (MENU) button 12 and selects the item of "200% dynamic range" by a judgment of the user, the dynamic range expanding process is performed.

The present embodiment is based on the premise that the pixel sensitivity characteristic of the G filter has approximately a twofold sensitivity compared to each pixel sensitivity characteristic of the R and B filters as described above. Accordingly, in a state where a light source is extremely red or extremely blue when shooting, the pixel sensitivity of the R and B filters is often saturated compared to the pixel sensitivity of the G filter. If the dynamic range expanding process is performed in this state, accurate gradations and an exact color reproduction are not obtained. Therefore, in this state, the user should not select the item of "200% dynamic range" by the judgment of the user.

Figure 5:
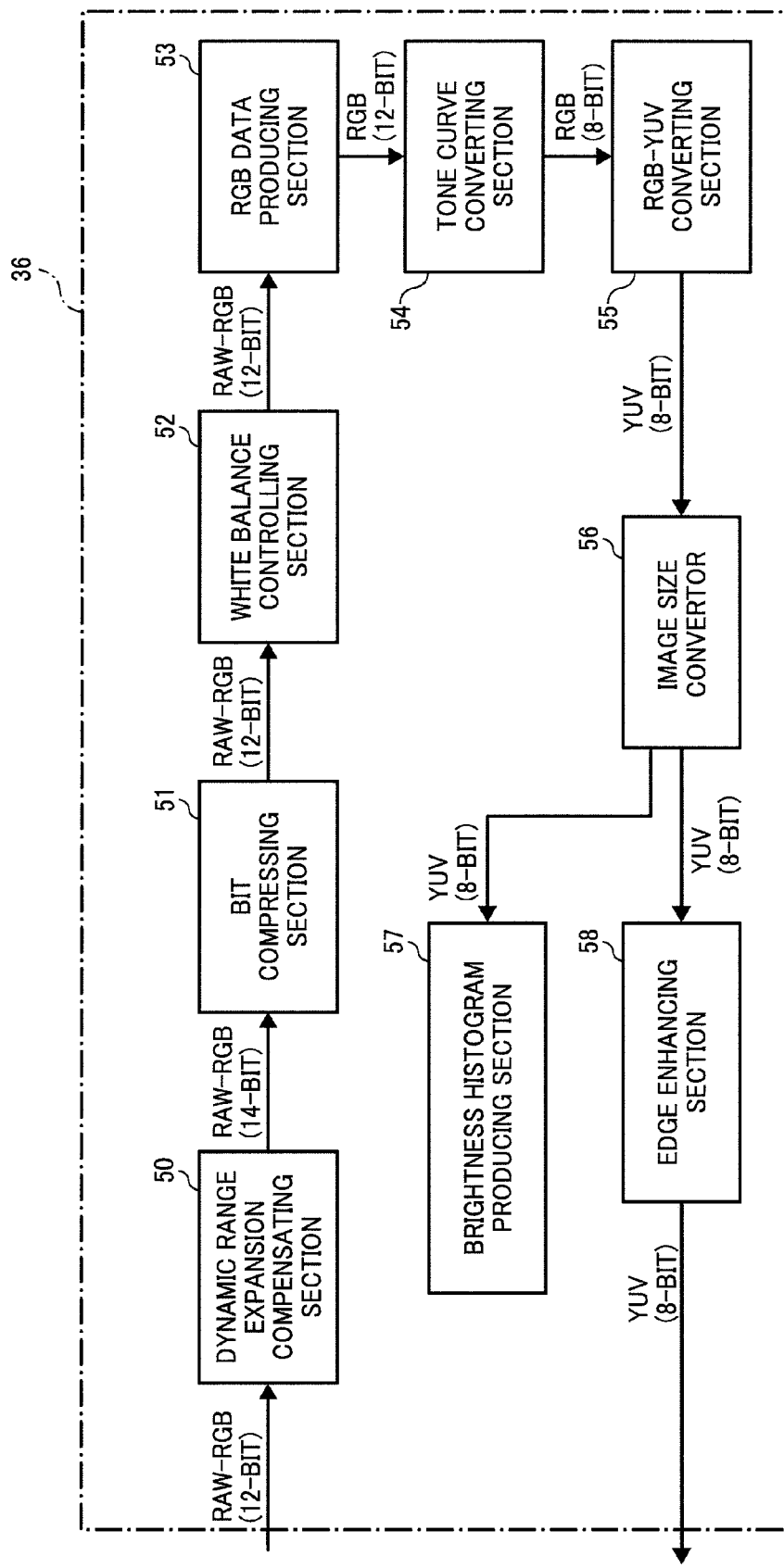
FIG. 5 is a block diagram illustrating a configuration of a YUV converting section in embodiment 1 of the present invention.

The dynamic range expanding process is performed in the YUV converting section 36. As illustrated in FIG. 5, the YUV converting section 36 comprises a dynamic range expansion compensating section (hereinafter, it is called a "D range expansion compensating section") 50, a bit compressing section 51 (a bit compression convertor), a white balance controlling section 52, an RGB data producing section 53, a tone curve converting section 54, an RGB-YUV converting section 55, an image size convertor 56, a brightness histogram producing section 57, and an edge enhancing section 58.

Figures 6, 7:
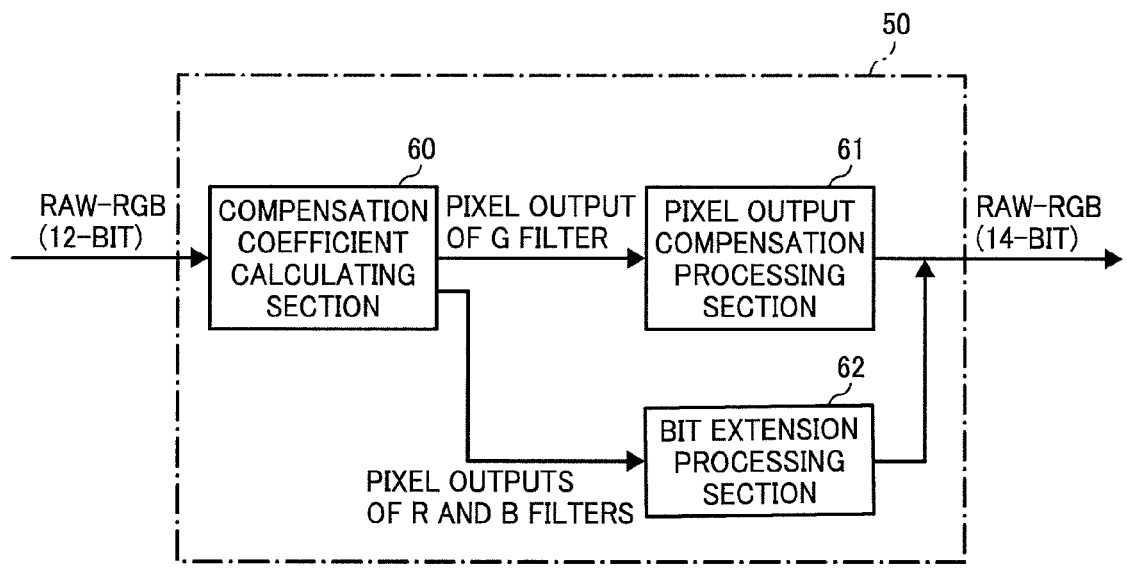
FIG. 6 is a block diagram illustrating a configuration of a D (dynamic) range expansion compensating section in embodiment 1 of the present invention.
FIG. 7 illustrates an arrangement position and a processing unit of an RGB filter in embodiment 1 of the present invention.

As illustrated in FIG. 6, the D range expansion compensating section 50 comprises a compensation coefficient calculating section 60 (a pixel output judging section), a pixel output compensation processing section 61 (a pixel output compensation processor), and a bit extension processing section 62. The RAW-RGB data is firstly inputted into the compensation coefficient calculating section 60.

The compensation coefficient calculating section 60 detects a pixel output of each pixel provided with an RGB filter from the inputted RAW-RGB data, and judges whether a pixel output of the pixel provided with the G filter (hereinafter, it is called "pixel output of G filter") reaches a saturation level which is set beforehand and judges whether each pixel output of pixels provided with the R and B filters (hereinafter, it is called "pixel outputs of R and B filters") in the vicinity of the pixel provided with the G filter reaches a predetermined output level which is set beforehand. And in a case where the pixel output of the G filter reaches the saturation level and at least one of pixel outputs of the R and B filters reaches the predetermined output level, the compensation coefficient calculating section 60 calculates a compensation coefficient, which is described later, to compensate the pixel output of the G filter.

The pixel output compensation processing section 61 performs a compensating process of the pixel output of the G filter by multiplying the pixel output of the G filter by the compensation coefficient calculated in the compensation coefficient calculating section 60.

The bit extension processing section 62 performs only a bit extension from 12-bit to 14-bit each on the pixel outputs of the R and B filters without performing a conversion of an output level.

In a case where the compensation coefficient for the pixel output of the G filter is calculated in the compensation coefficient calculating section 60, in the present embodiment, for each pixel of the CCD 20 having the RGB filter, 2×2 pixels (2 pixels of the G filter, 1 pixel of the R filter, and 1 pixel of the B filter) in a bold-line frame A is taken as a processing unit (minimum unit), as illustrated in FIG. 7. A compensation coefficient (K) of the pixel output of the G filter, and a pixel output (Ge) of the G filter after performing the compensating process are calculated respectively by a formula (1) and a formula (2) below.

$$K=\{1\times f(Ro)+m\times f(Go)+n\times f(Bo)\}/3 \quad \text{formula (1)}$$

$$Ge=K\times Go \quad \text{formula (2)}$$

In the above formulas (1) and (2), l, m, and n are coefficients which are set based on sensitivity rates of each filter of the RGB filter and Go is a pixel output of the G filter before performing the compensating process. f (Ro), f (Go), and f (Bo) are coefficients which are set by Number 1 (formulas (3) to (5)) below.

[Number 1]

$$\text{if } Ro \leq TR: f(Ro)=1$$

$$\text{if } Ro>TR: f(Ro)=Ro/TR \quad \text{formulas (3)}$$

$$\text{if } Go<TG: f(Go)=1$$

$$\text{if } Go=TG: f(Go)=Go/TG \quad \text{formulas (4)}$$

$$\text{if } Bo \leq TB: f(Bo)=1$$

$$\text{if } Bo>TB: f(Bo)=Bo/TB \quad \text{formulas (5)}$$

Ro is a pixel output of the R filter, TR is a predetermined output level of a pixel output of the R filter, Go is a pixel output of the G filter before the compensating process, TG is a saturation level of a pixel output of the G filter, Bo is a pixel output of the B filter, and TB is a predetermined output level of a pixel output of the B filter.

Figure 8:
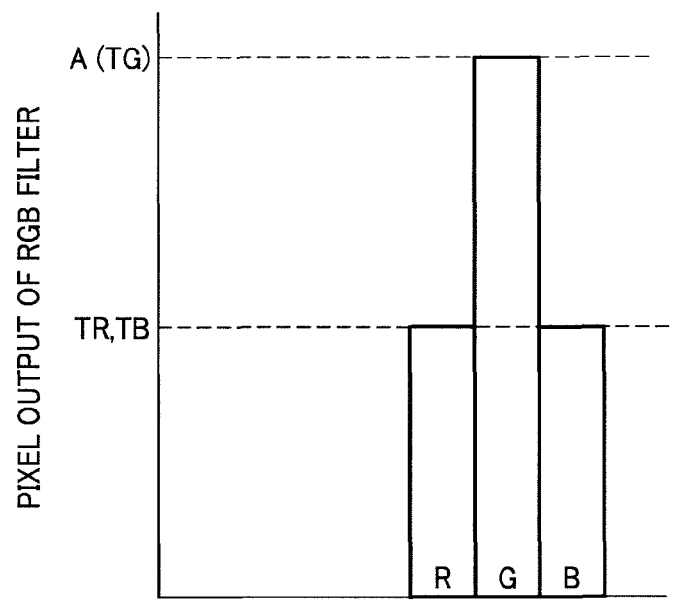
FIG. 8 illustrates a predetermined saturation level (TG) of a pixel output of a G filter, and predetermined output levels (TR, TB) of pixel outputs of R and B filters of an RGB filter.

In the formulas (3) to (5) and FIG. 8, TG (A) is the saturation level of the pixel output of the G filter, TR is the predetermined output level of the pixel output of the R filter, and TB is the predetermined output level of the pixel output of the B filter.

In the present embodiment, as described above, a sensitivity of the pixel provided with the G filter is twice as high as sensitivities of the pixel provided with the R and b filters, therefore the pixel of the G filter firstly reaches a saturation level A. A saturation level of the pixel output of the G filter is taken as TG (A), and each saturation level of the pixel outputs of the R and B filters is set to ½ value of the TG. TR and TB are taken as predetermined output levels of the pixel outputs of the R and B filters, respectively. TR, TG, and TB depend on a sensitivity rate of a solid-state image sensor (CCD and the like) having an RGB filter used for an imaging apparatus (digital camera and the like), therefore they are not limited to values as illustrated in FIG. 8.

In terms of the sensitivity rate of each pixel output of the RGB filter, in a case illustrated in FIG. 8, the coefficients 1 and n are respectively taken as ½ and m is taken as 0 in the above formula (1), and thereby the compensation coefficient (K) of the pixel output of the G filter is calculated. And a value of the pixel output (Ge) of the G filter after performing the compensating process calculated from the above formula (2) used by this compensation coefficient (K) is replaced as a value of the pixel output of 2 G filters in the processing unit (see FIG. 7).

This value of the pixel output of the G filter becomes data which exceed a value of 12-bit data in a case of performing an A/D conversion, therefore the value of the pixel output of the G filter is once replaced by 14-bit data. Accordingly, both maximum values of the pixel outputs of the R and B filters are 4095 (12-bit), and the maximum value of the pixel output of the G filter becomes 8190, therefore it can be treated as 14-bit data.

Incidentally, before the compensation coefficient of the pixel output of the G filter is calculated in the compensation coefficient calculating section 60, a compensation of a defective pixel needs to be completed. That is, in a case where there is a defective pixel in each pixel output provided with the RGB filter and there is a pixel which outputs a value always is saturated, the compensation coefficient becomes a larger value, and as a result, the pixel output of the G filter after the compensation is replaced by a larger value, therefore a new defective pixel is produced. Accordingly, in the present embodiment, a defective pixel removal processing section (not illustrated), which removes a defective pixel, is provided with the CCD I/F 34.

In the formulas (3) to (5), in a case where the pixel output of the G filter of the RGB filter is less than or equal to the saturation level TG, and the pixel outputs of the R and B filters of the RGB filter are less than or equal to the predetermined output level TR and TB, each coefficient f (Ro), f (Go) and f (Bo) is set to be "1". This is in order that a value of the pixel output of the G filter after the compensation (Ge) does not become smaller than a value of the pixel output of the G filter before the compensation (Go).

Figure 9A:
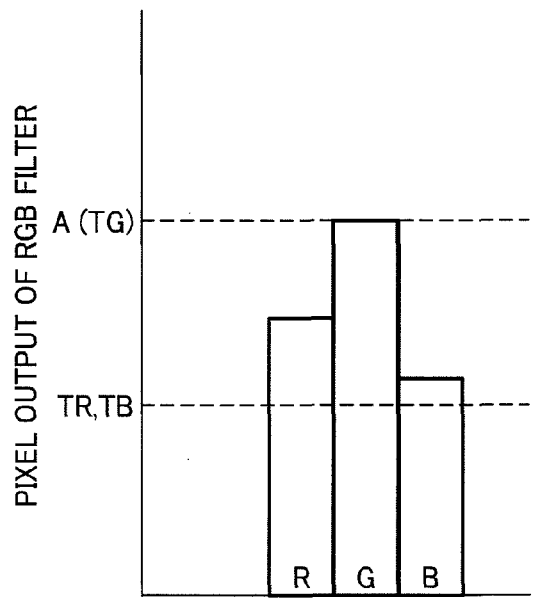
FIG. 9A illustrates a case where the pixel output of the G filter reaches the saturation level and each pixel output of the R and B filters in the vicinity of the G filter is relatively high (less than each saturation level).
Figure 9B:
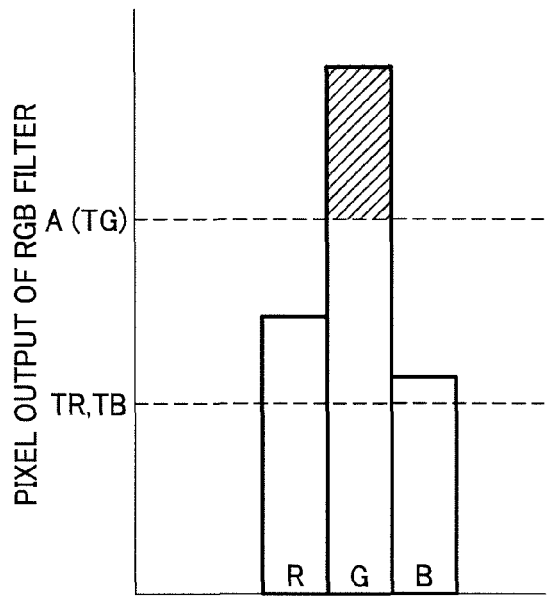
FIG. 9B illustrates a state where the pixel output of the G filter is compensated to expand to equal to or more than the saturation level A.

That is, for example, as illustrated in FIG. 9A, in a case where the pixel output of the G filter in the processing unit (see FIG. 7) reaches the saturation level A and each pixel output of the R and B filters in the vicinity of the G filter is relatively high (less than each predetermined saturation level), as illustrated in FIG. 9B, based on the formulas (1) to (5), the pixel output of the G filter is compensated to expand equal to and more than the saturation level A, and thereby the dynamic range is expanded.

Figure 10A:
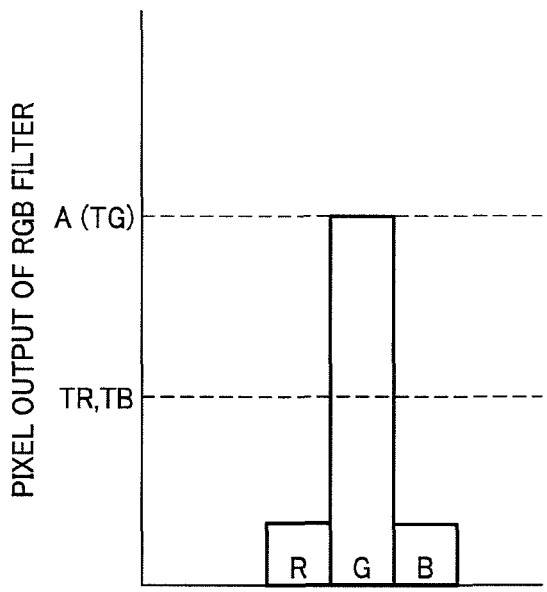
FIG. 10A illustrates a case where each pixel output of the R and B filters in the vicinity of the G filter is extremely small, when the pixel output of the G filter reaches the saturation level.
Figure 10B:
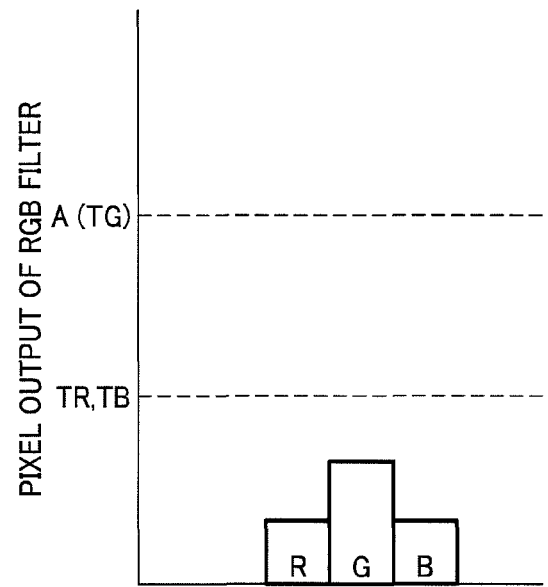
FIG. 10B illustrates a state where the pixel output of the G filter is less than or equal to the saturation level, in a case where each pixel output of the R and B filters in the vicinity of the G filter is extremely small when the pixel output of the G filter reaches the saturation level.

However, for example, as illustrated in FIG. 10A, even when the pixel output of the G filter reaches the saturation level A, there often is a case where each pixel output of the R and B filters in the vicinity of the G filter is extremely small compared to the pixel output of the G filter. In this case, in the formulas (3) to (5), when the pixel output of the G filter of the RGB filter is smaller than the saturation level TG and each pixel output of the R and B filters of the RGB filter is smaller than the predetermined output level TR and TB, in a case where each of the coefficients f (Ro), f (Go), and f (Bo) is not set to be "1", if the pixel output of the G filter is compensated, as illustrated in FIG. 10B, a problem such that the pixel output of the G filter is less than or equal to the saturation level A occurs, due to an influence of the R and B filters where each pixel output in the vicinity of the G filter is extremely small.

Therefore, as illustrated in the formulas (3) to (5), a comparison of the pixel output of the G filter and the saturation level of the pixel output of the G filter, a comparison of the pixel output of the R filter and the predetermined output level of the pixel output of the R filter, and a comparison of the pixel output of the B filter and the predetermined output level of the pixel output of the B filter are performed respectively, and a dynamic range expansion is performed only in a case where a calculation result becomes larger than a former value of the pixel output of the G filter used for the above comparison, as illustrated in FIG. 9B. In FIGS. 9A, 9B, 10A and 10B, A (TG) is a saturation level of the pixel output of the G filter, TR is a predetermined output level of the pixel output of the R filter, and TB is a predetermined output level of the pixel output of the B filter.

Thus, even when the pixel output of the G filter reaches the saturation level A, in a case where each pixel output of the R and B filters in the vicinity of the G filter is extremely small compared to the pixel output of the G filter, the compensating process on the pixel output of the G filter is canceled, and thereby a color deviation occurring by the pixel output of the G filter which is lowered is prevented.

In addition, even if the pixel output of the G filter does not reach its saturation level (that is, even if conditions of the formulas 4 are not met), in a case where conditions of the formulas 3 and/or the formulas 5 are met, it is possible to perform the above compensating process of the pixel output of the G filter.

And data of the pixel output of the R and B filters, and data of the pixel output of the G filter where the compensating process is performed are outputted from the D range expansion compensating section 50 to the bit compressing section 51. The bit compressing section 51, for example, by a conversion characteristic as illustrated in FIG. 11A (in FIG. 11A, a four-sectional broken line approximation characteristic in which three sectional points are specified and intervals between these three sectional points are approximated by a straight line), compresses the pixel output of the G filter of each pixel output of the RGB filter which are extended to 14-bit data, to 12-bit data. In FIG. 11A, a dash-line square "a" illustrates a range of 12-bit data, and a dash-dot line "b" illustrates a simple linear conversion characteristic in which data of the maximum value, 8190, is multiplied by ½.

In the conversion characteristic illustrated in FIG. 11A, the maximum value of the pixel output of the G filter is 8190, therefore 8190 is compressed so as to become 4095. Values of the pixel outputs of the R and B filters are also compressed in accordance with a compression rate of the pixel output of the G filter.

In the present embodiment as described above, as an example in a case where the pixel output of the G filter extended to the maximum value, 8190, is compressed to the maximum value, 4095, the conversion characteristic (a solid line in FIG. 11A) having the three sectional points as illustrated in FIG. 11A is used. In the present embodiment, the following two effects which are not obtained by a simple non-sectional point linear conversion characteristic ("b" in FIG. 11A) are obtained.

As a first effect, more bit numbers are allocated to reliable data. That is, in a case where the compensating process is performed on the pixel output of the G filter which reaches the saturation level, the compensating process is performed on a range which is equal to or more than a prescribed value in the vicinity of the saturation level of the pixel output of the G filter, and the compensating process is not performed on a range which is equal to or less than this prescribed value. Therefore, the accuracy of the data is different in ranges on which the compensating process is performed and is not performed.

That is, in a case where the pixel output of the G filter which is saturated is compensated by the formulas (1) to (5), depending on a color of a main photographic subject, a brightness level of the photographic subject is not often reproduced accurately in a range where the compensating process is performed. On the other hand, in a range where the compensating process is not performed, data is actual data (an analog RGB image signal) that is outputted from the CCD 20 having the RGB filter and A/D converted. Therefore, this data is highly reliable.

That is, in the conversion characteristic (a solid-line in FIG. 11A) illustrated in FIG. 11A in the present embodiment, for example, when a value of input 14-bit data is 1024, a value of output 12-bit data is 1024, and this illustrates that former data (the input 14-bit data) is used. On the other hand, for example, when a value of input 14-bit data is 3072, a value of output 12-bit data is 2560, and in this range a bit allocation is smaller than a bit allocation before the compensating process, and thereby some bit errors occur.

Thus, the conversion characteristic (a solid-line in FIG. 11A) having the three sectional points as illustrated in FIG. 11A of the present embodiment is adopted, instead of the simple non-sectional point linear conversion characteristic (a dash-dot line "b" in FIG. 11A), so that the bit allocation can be gradually smaller, and more bit numbers can be allocated to the data which is highly reliable.

As a second effect, gradations in low and middle brightness are accurately saved. That is, in a case where a bit compression is performed by the simple non-sectional point linear conversion characteristic ("b" in FIG. 11A), an image where gradations have been lost is obtained. Accordingly, an image where the compensating process is not performed in a low brightness becomes an image where gradations have been lost. Therefore, an image where gradations have been lost may be obtained. On the other hand, in a case where the bit compression is performed by the conversion characteristic according to the present embodiment as illustrated in FIG. 11A, in a compression where the compensating process is not performed in the low brightness level, a compression rate so as to become an approximately same value before and after performing the bit compressions in the bit compressing section 51 is used, so that the gradations in the low brightness level can be maintained favorably.

In the present embodiment, when the extended 14-bit data of the pixel output of the G filter is compressed to 12-bit data, as illustrated in FIG. 11A, the bit compression is performed by the four-sectional broken line approximation characteristic (conversion characteristic) in which the three sectional points are specified and the intervals between these three sectional points are approximated by the straight line, however the number of these sections is not limited especially. For example, a conversion characteristic may be a two-sectional broken line approximation characteristic in which one sectional point is specified, however the bit allocation is changed significantly in the vicinity of the sectional point, and thereby the two effects described above become smaller. Therefore, a preferable conversion characteristic is a broken line approximation characteristic (conversion characteristic) having the number of sections which is equal to or more than three sections.

In addition, the conversion characteristic in which the extended 14-bit data of the pixel output of the G filter is compressed to 12-bit data, as illustrated in FIG. 11B, may be a conversion characteristic by a curved line which does not have a plurality of sectional points. That is, the conversion characteristic by this curved line is a conversion characteristic having the number of sections of 8192, while the conversion characteristic illustrated in FIG. 11A is the conversion characteristic having the four sections. In FIG. 11B, a dash-line square "a" illustrates a range of 12-bit data.

Additionally, a look-up table having numerical value data after compressing to 12-bit data is provided for values from 0 to 8192 of input 14-bit data, so that the extended 14-bit data of the pixel output of the G filter can be compressed favorably to 12-bit data by the conversion characteristic by this curved line.

Each pixel output data of the RGB filter compressed from 14-bit data to 12-bit data in the bit compressing section 51 is inputted to the white balance controlling section 52. The white balance controlling section 52 respectively amplifies each pixel output data of the RGB filter which is inputted. In this case, the controlling section 28 calculates a compensation value to adjust a white balance on the basis of the AWB evaluation value which is calculated in the CCD I/F 34, and the compensation value which is calculated is outputted to the white balance controlling section 52. The white balance controlling section 52 adjusts the white balance on the basis of the compensation value which is inputted.

Each pixel output data of the RGB filter (12-bit) in which the white balance is adjusted in the white balance controlling section 52 is inputted to the RGB data producing section 53. The RGB data producing section 53 performs an interpolation calculating process on RAW data which has only one color data for one pixel, and produces all data of RGB for one pixel.

Figure 12:
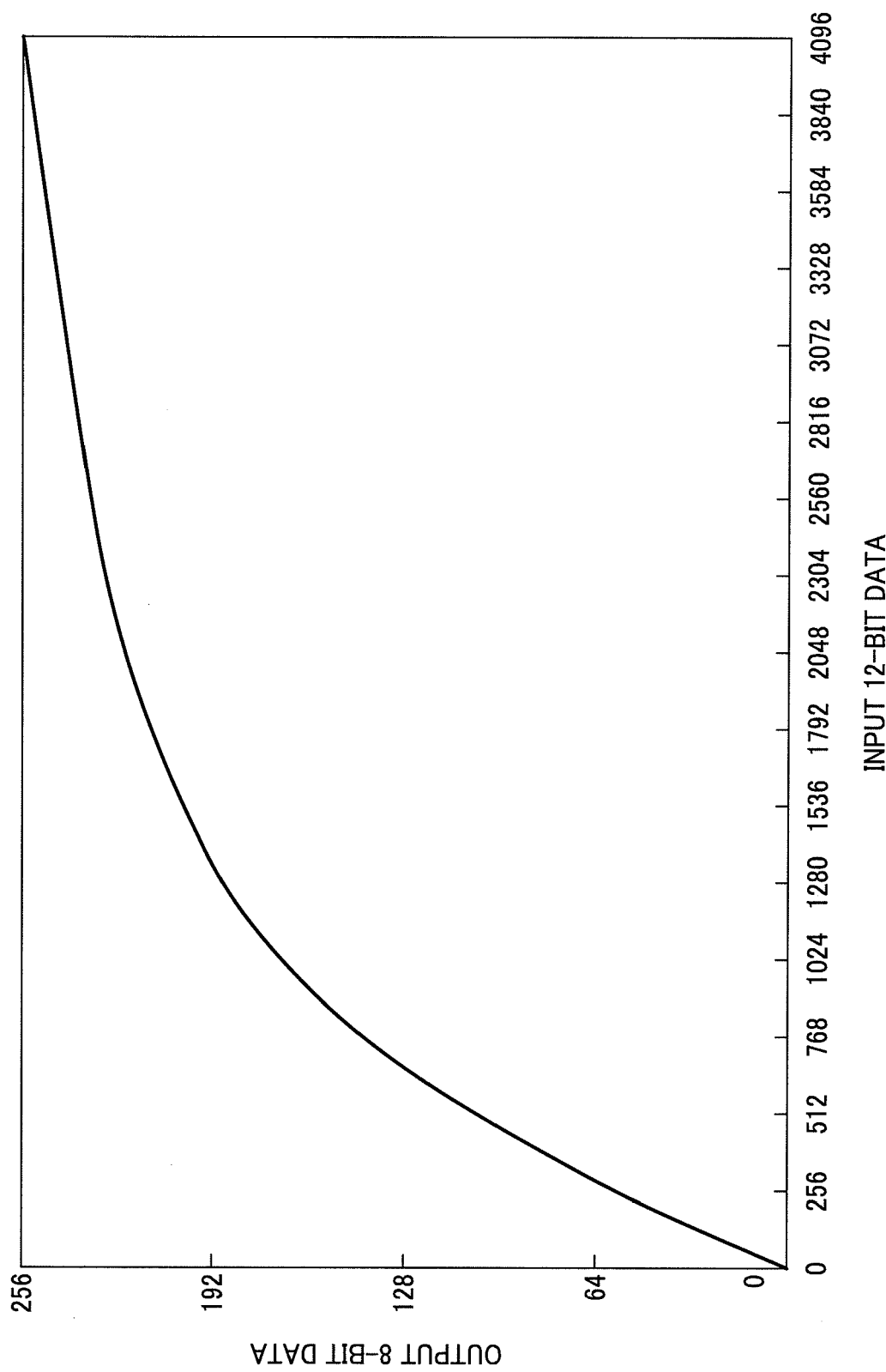
FIG. 12 illustrates a conversion table in which 12-bit RGB data converts (γ-converts) into 8-bit RGB data.

All the data (12-bit) of RGB which is produced in the RGB data producing section 53 is inputted to the tone curve converting section 54. The tone curve converting section 54 performs a γ conversion, which converts 12-bit RGB data to 8-bit RGB data, by a conversion table as illustrated in FIG. 12, and produces 8-bit RGB data, and then outputs the 8-bit RGB data to the RGB-YUV converting section 55.

The RGB-YUV converting section 55 converts the RGB data (8-bit) which is inputted to YUV data by a matrix calculation, and outputs the YUV data to the image size convertor 56. The image size convertor 56 performs a reduction or an expansion to a desired image size on the YUV data (8-bit) which is inputted, and outputs the YUV data on which the reduction or the expansion to the desired image size is performed to the brightness histogram producing section 57 and the edge enhancing section 58.

The brightness histogram producing section 57 produces a brightness histogram by the YUV data which is inputted. The edge enhancing section 58 performs an edge enhancing process and the like in accordance with an image on the YUV data which is inputted and stores the YUV data in the SDRAM 23 via the memory controller 35.

Thus, in the present embodiment, even when shooting where the pixel output of the G filter in the processing unit in which a sensitivity is high exceeds the saturation level, the pixel output of the G filter which is saturated is compensated on the basis of the pixel output of the R and B filters in which sensitivities are low. And thereby, as illustrated in FIG. 3, on the basis of a compensation area (dash-dot line parts of the pixel output of G filter of "d" and "e" in FIG. 3) where the pixel output of the G filter ("d" and "e" in FIG. 3) is compensated, the dynamic range can be expanded by 200% at one shooting.

Therefore, even in a case where there is a high-brightness part in a background and the like in a photographic subject image, it is possible to prevent a whiteout from occurring and obtain favorable gradation characteristics.

Figure 13A:
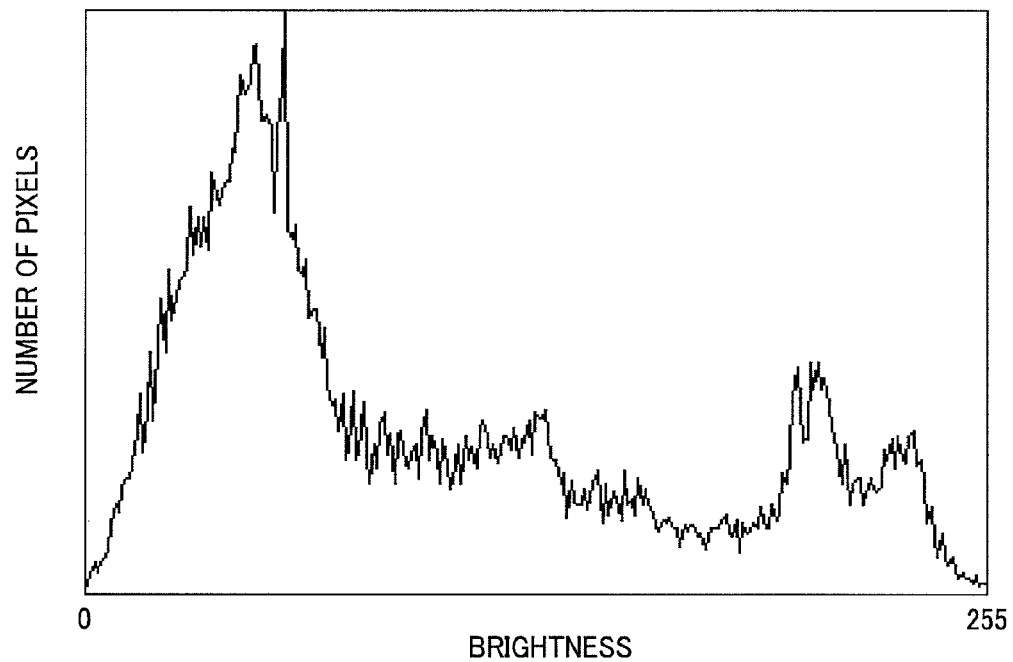
FIG. 13A illustrates a histogram in a case where a dynamic range expanding process is performed in embodiment 1 of the present invention.

FIG. 13A illustrates an example of a histogram which is produced in the brightness histogram producing section 57, in a case where the dynamic range expanding process according to the present embodiment is performed, when the pixel output of the G filter exceeds the saturation level. It is clear from this histogram that whiteout hardly occurs at a maximum brightness part (255), and favorable gradations are reproduced, by performing the dynamic range expanding process.

Figure 13B:
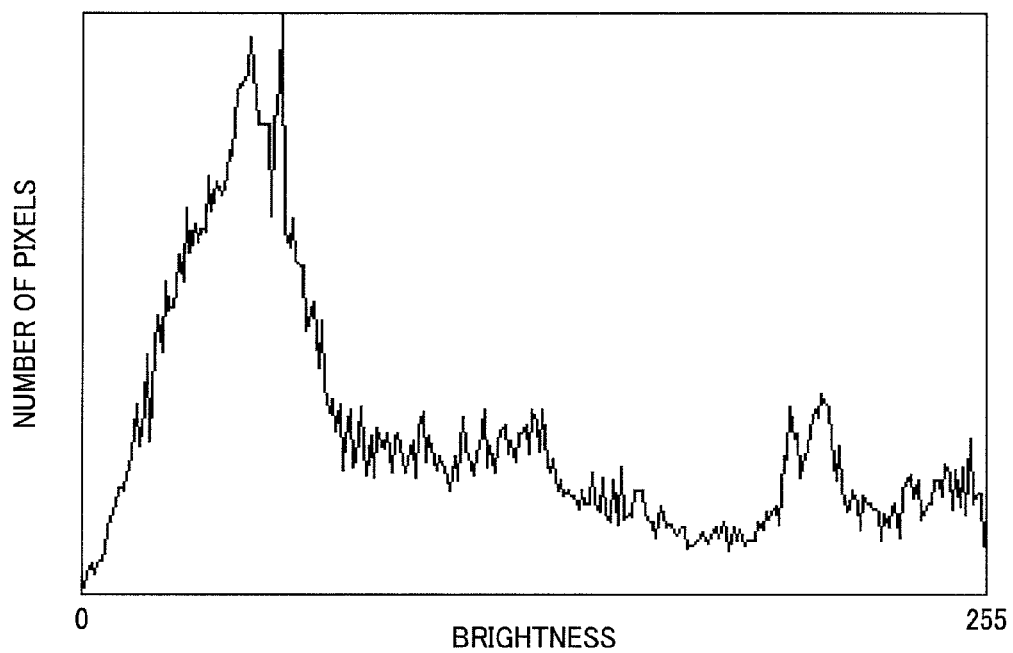
FIG. 13B illustrates a histogram in a case where the dynamic range expanding process is not performed in embodiment 1 of the present invention.

On the other hand, FIG. 13B illustrates an example of a histogram which is produced in the brightness histogram producing section 57, in a case where the dynamic range expanding process according to the present embodiment is not performed, when the pixel output of the G filter exceeds the saturation level. It is clear from this histogram that bars at the maximum brightness part (255) in this histogram have heights, and whiteout occurs, by not performing the dynamic range expanding process.

In the above explanation of embodiment 1 and FIGS. 3 and 8, it is explained that the saturation level A in FIG. 3 which is a predetermined saturation level value corresponds to a maximum value, which is 4095, of 12-bit data after compensating, and the saturation level TG in FIG. 8 corresponds to a maximum value, which is 4095, of 12-bit data after compensating; however a saturation level value is not limited to the above. For example, in the vicinity of a high brightness part where the output is completely saturated, in a CCD having an RGB filter in which a linearity of the output is not good, for example, a value of 4032, which is smaller than a value of 4095 which is the maximum value of 12-bit data and in which the output is completely saturated, is taken as a predetermined saturation level value (the saturation level A in FIG. 3), and a pixel output which exceeds the above value may be a subject of the compensating process.

In addition, depending on configurations of digital cameras, the saturation level value is less than a maximum value of the 12-bit data, which is 4095, even in a high-brightness photographic subject. Also in this case, the predetermined saturation level may be a smaller value than a value of 4095.

Thus, even when a predetermined saturation level is less than a value of 4095, a conversion curve illustrated in FIG. 12 is changed in accordance with a conversion characteristic, so that a value of the output of the bit compressing section 51 can be 4095, and it is possible to expand the dynamic range without changing subsequent processes.

In the present embodiment, for example, in a case where the pixel output of the G filter reaches its saturation level and at least one of the pixel outputs of the R filter and the B filter reaches each saturation level, a compensation value of the pixel output of the G filter calculated by the formulas (1) to (5) is inaccurate. And the compensating process is not performed on the at least one of the pixel outputs of the R filter and the B filter in the present embodiment, therefore there is a possibility that a hue may be changed.

Accordingly, in a case where the pixel output of the G filter reaches its saturation level and at least one of the pixel outputs of the R filter and the B filter reaches each saturation level, preferably the dynamic range expansion process by the above compensating process is not performed. In a case where the pixel output of the G filter reaches a saturation level of the G filter and at least one of the pixel outputs of the R filter and the B filter reaches each saturation level, assuming that brightness in the processing unit is extremely bright, the pixel output of the G filter which is determined beforehand may be set to, for example, Pixel output of the G Filter=4096×1.8=7372 (14-bit).

Additionally, in the present embodiment, as illustrated in FIG. 5, the bit compressing section 51 is configured to compress the 14-bit RAW-RGB data (pixel output data of the RGB filter) which is outputted from the D range expansion compensating section 50 into 12-bit data, and the white balance controlling section 52 and the RGB data producing section 53 are configured to perform data processes of the 12-bit data. However, other than the above configuration, the bit compressing section 51 is provided behind the RGB data producing section 53, and the bit compressing section 51 may be configured to compress the 14-bit data which is outputted from the RGB data producing section 53 into the 12 bit-data.

Embodiment 2

Figure 14:
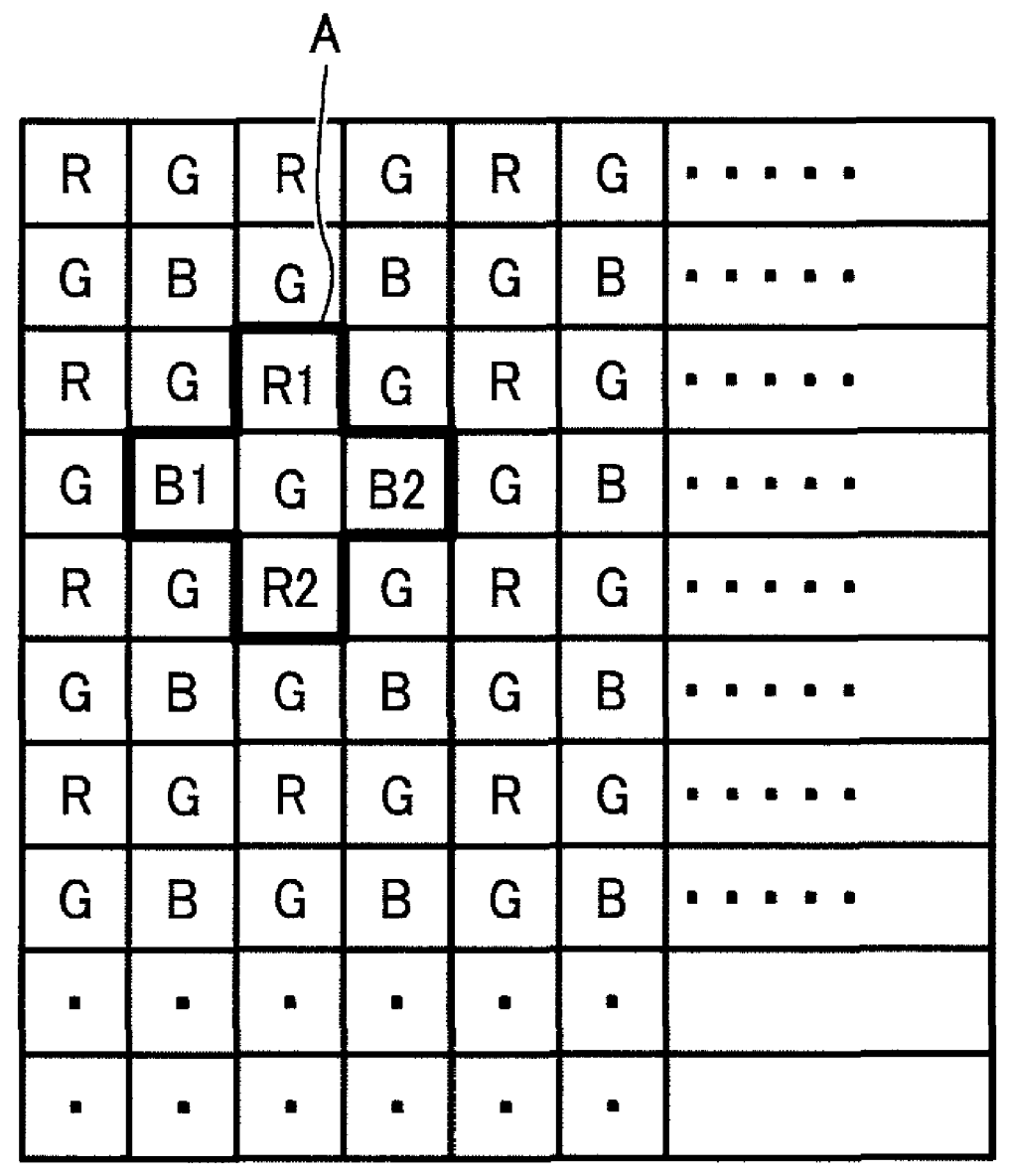

In embodiment 1, as illustrated in FIG. 7, for the CCD 20 having the RGB filter, 2×2 pixels is taken as the processing unit (minimum unit). However, in the present embodiment, as illustrated in FIG. 14, a processing unit (minimum unit) includes five pixels in a bold-line frame A (one pixel of the G filter, two pixels of the R filter (R1 and R2) and two pixels of the B filter (B1 and B2)), and the processing unit of the present embodiment has a wider range than the processing unit of embodiment 1. In embodiment 2, a configuration of a digital camera, a monitoring operation, a still image shooting operation, and a dynamic range expanding process are similar to embodiment 1.

In the present embodiment, the compensation coefficient calculating section 60 calculates an average value of the pixel output of 2 of R1 and R2 filters and an average value of the pixel output of 2 of B1 and B2 filters in the vicinity of 1 of the pixel of the G filter in the processing unit (see FIG. 14), and each calculated average value is taken as each pixel output value of the R and B filters in the processing unit (see FIG. 14).

In a case where the pixel output of the G filter which is in the processing unit of the bold-line frame A as illustrated in FIG. 14 reaches the saturation level, a sensitivity of the G filter is approximately twice as high as the sensitivities of the R and B filters as described above, and a compensation coefficient of a pixel output of the G filter (K) and a pixel output of the G filter after compensation (Ge) is calculated by the formulas (6) and (7) below.

$$K = \{1 \times f(Ra) + m \times f(Ga) + n \times f(Ba)\}/3 \quad \text{formula (6)}$$

$$Ge = K \times Ga \quad \text{formula (7)}$$

l, m, and n are coefficients which are set based on sensitivity rates of each filter of the RGB filter, and Ga is a pixel output of the G filter before compensation. And f (Ra), f (Ga), f (Ba) are coefficients which are set by Number 2 (formulas (8) to (10)) below.

[Number 2]

$$\text{if } Ra \leq TR: f(Ra) = 1$$

$$\text{if } Ra > TR: f(Ra) = Ra/TR \quad \text{formulas (8)}$$

$$\text{if } Ga < TG: f(Ga) = 1$$

$$\text{if } Ga = TG: f(Ga) = Ga/TG \quad \text{formulas (9)}$$

$$\text{if } Ba \leq TB: f(Ba) = 1$$

$$\text{if } Ba > TB: f(Ba) = Ba/TB \quad \text{formulas (10)}$$

Ra is an average value of the pixel output of the R filter in the processing unit (see FIG. 14), TR is a predetermined output level of the pixel output of the R filter, Ga is a pixel output of the G filter in the processing unit (see FIG. 14), TG is a saturation level of the pixel output of the G filter, Ba is an average value of the pixel output of the B filter in the processing unit (see FIG. 14), and TB is a predetermined output level of the pixel output of the B filter.

TR, TG, and TB in the formulas (8) to (10) are similar to those in the formulas (3) to (5). And as for coefficients l, m and n in the formula (6), if sensitivity rates of each pixel output of the RGB filter are similar to those in embodiment 1, the coefficients l and n are 3/2 respectively, and the coefficient m is 0.

The pixel output compensation processing section 61 of the D range expansion compensating section 50 illustrated in FIG. 6 replaces a pixel output value of the G filter which is calculated by the formula (7) as a pixel output value of the G filter which is in the processing unit described above (see FIG. 14). Hereinafter, a similar process to embodiment 1 is performed.

Thus, by widening the processing unit, an influence by a sensitivity difference which pixels of the R1 and R2 filters and pixels of the B1 and B2 filters in the processing unit have is moderated. Therefore, it is possible to more accurately perform the dynamic range expansion compensating process on the pixel output of the G filter.

Embodiment 3

Figures 15, 16:
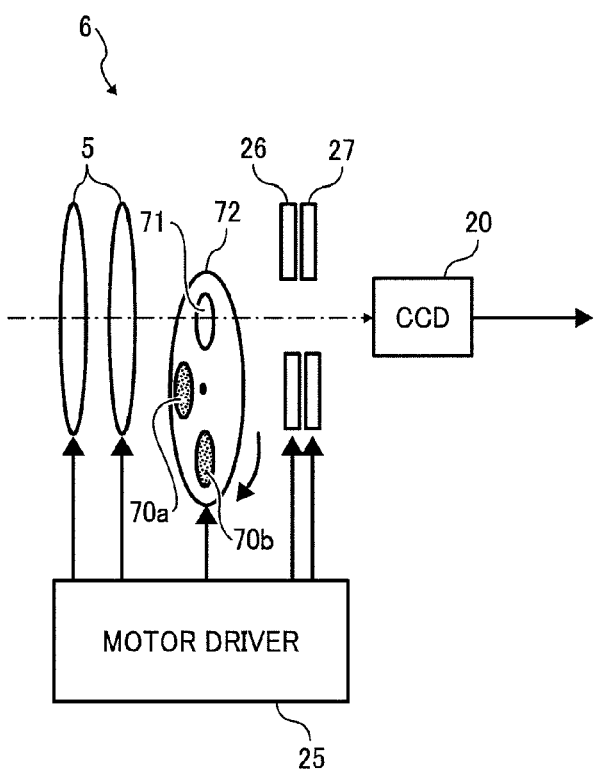
FIG. 15 illustrates a pixel arrangement position and a processing unit of an RGB filter in embodiment 3 of the present invention.
FIG. 16 illustrates a configuration in a lens barrel unit of the digital camera in embodiment 4.

In the present embodiment, as illustrated in FIG. 15, a processing unit (a bold-line frame A) is further widened than in a case of embodiment 2, for the CCD 20 having the RGB filter. In embodiment 3, a configuration of a digital camera, a monitoring operation, a still image shooting operation, and a dynamic range expanding process are similar to embodiment 1. The formulas (6) to (10) are used as calculation formulas of the compensation for the pixel output of the G filter as well as embodiment 2.

In the present embodiment, there are a plurality of pixels of the G filter in the vicinity of a pixel of the G filter in the center in the processing unit (see FIG. 15). Therefore, the compensation coefficient calculating section 60 also calculates an average value of the pixel output of the plurality of the pixels of the G filter, and a calculated average value is taken as a value of the pixel output of the G filter in the processing unit (see FIG. 15).

If the processing unit is widened, the dynamic range expansion compensating process is performed on the basis of brightness information in a wider range, and this is equivalent to applying a low-pass filter. Accordingly, an edge part of brightness variation may become dull. Therefore, in the present embodiment, a size of a wider processing unit is partially changed by use of the AF evaluation value, for example.

That is, in the CCD I/F 34 of the signal processing section 22 illustrated in FIG. 2, the AF evaluation value to perform the AF is calculated as described above. The AF evaluation value is equivalent to a so-called output of a high-pass filter (HPF), and a larger value is outputted in a part where there is brightness variation in an image plane of a photographic subject image. The controlling section 28 reads out an AF evaluation value when shooting a still image and judges a part where there is brightness variation in the image plane and a part where there is no brightness variation in the image plane. And the controlling section 28 controls the D range expansion compensating section 50 to set to narrow the processing unit in the part where there is brightness variation and to set to widen the processing unit in the part where there is no brightness variation as illustrated in FIG. 15, on the basis of this judging data.

Thus, even in a case where the processing unit is widened further, a setting to narrow the processing unit in the part where there is brightness variation is performed, and thereby it is possible to accurately perform the dynamic range expansion compensating process without reducing a resolution.

Embodiment 4

The present embodiment, as illustrated in FIG. 16, further comprises a turret plate 72 which is rotatable and has a first green color filter 70a, a second green color filter 70b in which light transmission rates are different, and an opening 71, in a space between the photographing lens system 5 and the mechanical shutter 70b of the lens barrel unit 6. The turret plate 72 is configured such that the turret plate 72 rotates by the motor driver 25 which is driven by a signal from the controlling section 28, and one of the first green color filter 70a, the second green color filter 70b, and the opening 71 of the turret plate 72 is selected and moved on an optical axis of the photographing lens system 5. Other configurations of a digital camera, a monitoring operation, and a still image shooting operation are similar to embodiment 1.

A state where the opening 71 of the turret plate 72 is moved on the optical axis of the photographing lens system 5 is similar to a configuration of embodiment 1 where there is nothing between the photographing lens system 5 and the aperture unit 26

Figure 17A:
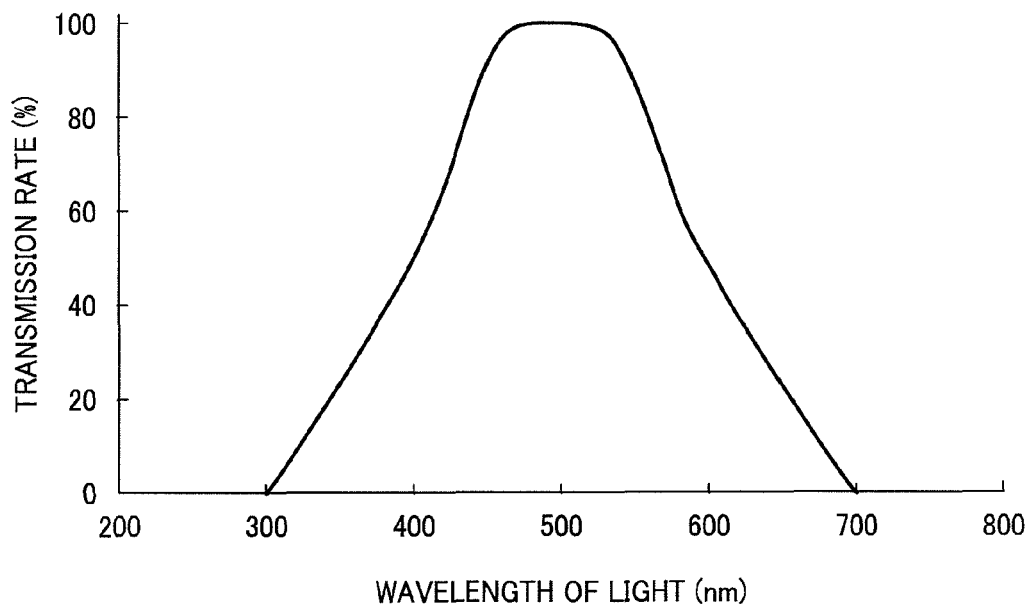
FIG. 17A is a diagram illustrating a relationship between a light transmission rate characteristic and wavelength of light of a first green color filter.
Figure 17B:
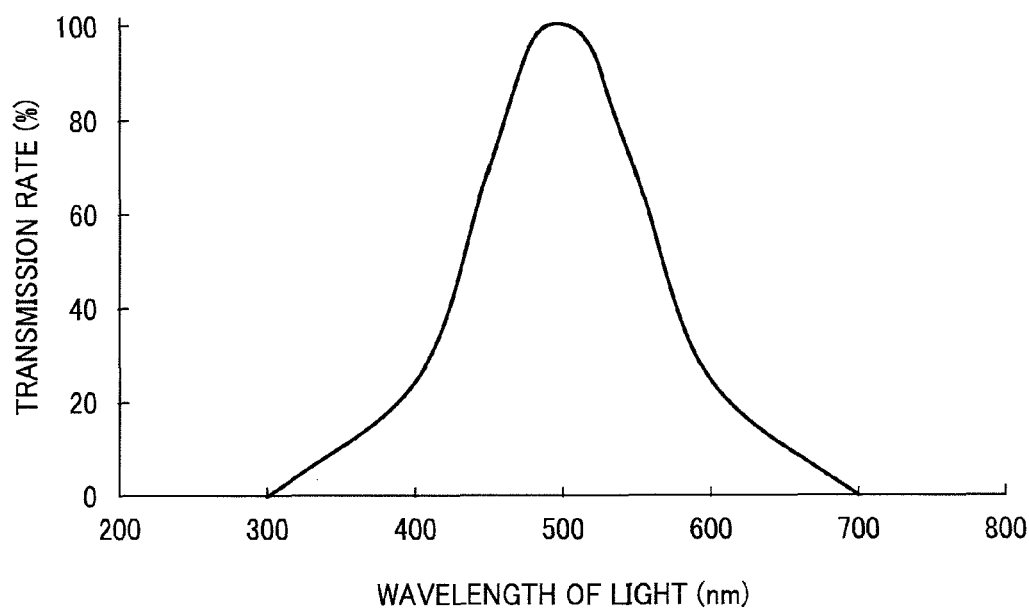
FIG. 17B is a diagram illustrating a relationship between a light transmission rate characteristic and wavelength of light of a second green color filter.

In a state where the first green color filter 70a or the second green color filter 70b of the turret plate 72 is moved on the optical axis of the photographing lens system 5, sensitivities of the R and B filters of the CCD having the RGB filter become greatly low. A sensitivity of the G filter remains unchanged. FIG. 17A is a diagram illustrating a relationship between a light transmission rate characteristic and wavelength of light of the first green color filter 70a, and FIG. 17B is a diagram illustrating a relationship between a light transmission rate characteristic and wavelength of light of the second green color filter 70b. As illustrated in these light transmission rate characteristics, the light transmission rate characteristic of the first green color filter 70a is only approximately twice as high as the light transmission rate characteristic of the second green color filter 70b.

In a state where the first green color filter 70a is moved on the optical axis of the photographing lens system 5, the first green color filter 70a has the light transmission rate characteristic such that sensitivities of the R and B filters become approximately half (½) of a case where there is no green color filter. Accordingly, relatively in this state, sensitivities of the R and B filters become approximately ¼ of the sensitivity of the G filter. (This is because the sensitivity of the G filter is approximately twice as high as the sensitivities of the R and B filters, as described above.)

In a state where the second green color filter 70b is moved on the optical axis of the photographing lens system 5, the second green color filter 70b has the light transmission rate characteristic such that sensitivities of the R and B filters become approximately ¼ of the case where there is no green color filter. Accordingly, relatively in this state, sensitivities of the R and B filters become approximately ⅛ of the sensitivity of the G filter. (This is because the sensitivity of the G filter is approximately twice as high as the sensitivities of the R and B filters, as described above.)

FIG. 18 illustrates each pixel output of the RGB filter when the first green color filter 70a is moved on the optical axis of the photographing lens system 5. In an RGB filter of a, the pixel output of the G filter in which the sensitivity is high is also in a state of being less than or equal to the saturation level A And in the present embodiment, as RGB filters of b, c, d, and e in FIG. 18, when the pixel output of the G filter reaches the saturation level A and each pixel output of the R and B filters is in a range of the predetermined output level, a pixel output level of the G filter is compensated to expand the dynamic range (a dot-chain line part) based on each pixel sensitivity characteristic of the R and B filters (f in FIG. 18) and a pixel sensitivity characteristic of the G filter (g in FIG. 18).

And, for example, in a case where there is an extremely bright part in a part of a background of a main photographic subject, based on a user's judgment, the menu (MENU) button 12 (see FIG. 1C) is pressed and an item of "400% dynamic range" is selected, and thereby a control signal is outputted from the controlling section 28 to the YUV converting section 36. A dynamic range expanding process which is similar to embodiment 1 is performed.

For example, a pixel output value of the G filter which reaches the saturation level in the processing unit which is similar to embodiment 1 (see FIG. 7) is calculated by the formulas (1) to (5). The sensitivity of the pixel of the G filter in the present embodiment as described above is approximately four times higher than both sensitivities of the pixels of the R and B filters.

The pixel output compensation processing section 61 of the D range expansion compensating section 50 illustrated in FIG. 6 replaces the pixel output value of the G filter calculated by the formulas (1) to (5) as the pixel output value of the G filter in the processing unit. The pixel output value of the G filter becomes data which exceed a value of 12-bit data, therefore here the data is once replaced by 14-bit data. Maximum values of the pixel outputs of the R and B filters are 4095 (12-bit), therefore a maximum value of the pixel output of the G filter is 16383 (14-bit).

The processing unit may be each processing unit in embodiment 2 and embodiment 3 (see FIGS. 14 and 15) other than the processing unit in embodiment 1 (see FIG. 7).

Figure 19:
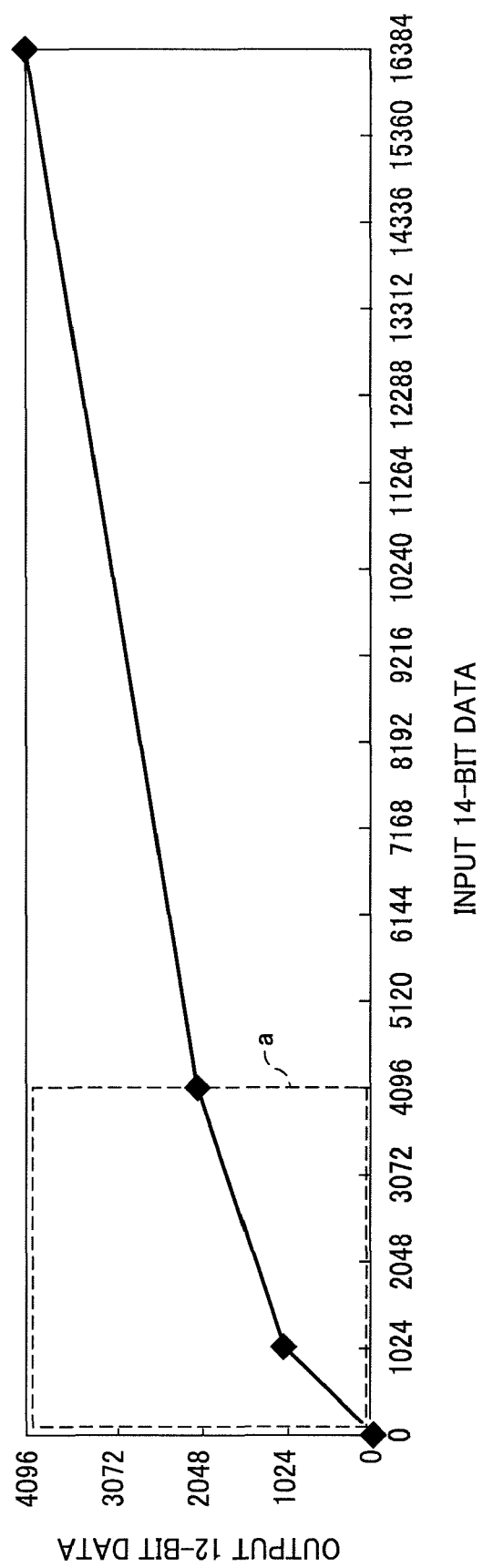
FIG. 19 illustrates a conversion characteristic of compressing expanded 14-bit data of the pixel output of the G filter to 12-bit data in embodiment 4 of the present invention.

The bit compressing section 51 compresses the pixel output of the G filter extended to 14-bit data to 12-bit data by a conversion characteristic illustrated in FIG. 19. In a conversion table illustrated in FIG. 19, the maximum value of the pixel output of the G filter is 16383, therefore 16383 is compressed to be 4095. And, the pixel output values of the R and B filters are compressed in accordance with a compression rate of the pixel output of the G filter. Hereinafter, a process similar to embodiment 1 is performed.

The compression rate in the low brightness level is lowered, so that a reproducibility of brightness (gradations) at a low brightness level can be maintained favorably.

Thus, in the present embodiment, even when shooting as the pixel output of the G filter in the processing unit reaches the saturation level, relatively the sensitivities of the R and B filters can be lowered to approximately ¼ of the sensitivity of the G filter by the first green color filter 70a which is moved on the optical axis of the photographing lens system 5. Therefore, as illustrated in FIG. 18, the dynamic range is expanded 4 times based on a compensation area of the pixel output of the G filter (dash-dot line parts, b, c, d and e of the pixel output of the G filter in FIG. 18) which is compensated at one shooting.

Embodiment 4 has a configuration such that the turret plate 72 which is rotatable and has the first and the second green color filters 70a and 70b with different light transmission rates and the opening 71 is placed between the photographing lens system 5 and the mechanical shutter unit 27 of the lens barrel unit 6. However, the turret plate 72 may be placed at a front side of the photographing lens system 5 (the opposite side of the lens barrel unit 6 from the mechanical shutter 27).

Embodiment 5

The present embodiment 4 has a configuration such that the first green color filter 70a of the turret plate 72 is moved on the optical axis of the photographing lens system 5 and thereby the dynamic range is expanded 4 times. And, the present embodiment is an example of the second green color filter 70b of the turret plate 72 being moved on the optical axis of the photographing lens system 5 and thereby the dynamic range is expanded 8 times. In the present embodiment, other configurations of a digital camera, a monitoring operation, and a still image photographing operation are similar to embodiment 1.

As described above, in a state where the second green color filter 70b is moved on the optical axis on the photographing lens system 5, relatively the sensitivities of pixels of the R and B filters are approximately ⅛ of the sensitivity of a pixel of the G filter.

For example, in a case where there is an extremely bright part in a part of a background of a main photographic subject, the menu (MENU) button 12 (see FIG. 1C) is pressed by a user's judgment and an item of "800% dynamic range" is selected, and thereby a control signal is outputted from the controlling section 28 to the YUV converting section 36, and the dynamic range expanding process which is similar to embodiment 1 is performed.

For example, a pixel output value of the G filter which reaches the saturation level in the processing unit (see FIG. 7) which is similar to embodiment 1 can be calculated by the formulas (1) to (5). In the present embodiment, the sensitivity of the pixel of the G filter is approximately 8 times higher than the sensitivities of the pixels of the R and B filters as described above. The processing unit may be each processing unit in embodiments 2 and 3 (see FIGS. 14 and 15) other than the processing unit (see FIG. 7) in embodiment 1.

Figure 20:
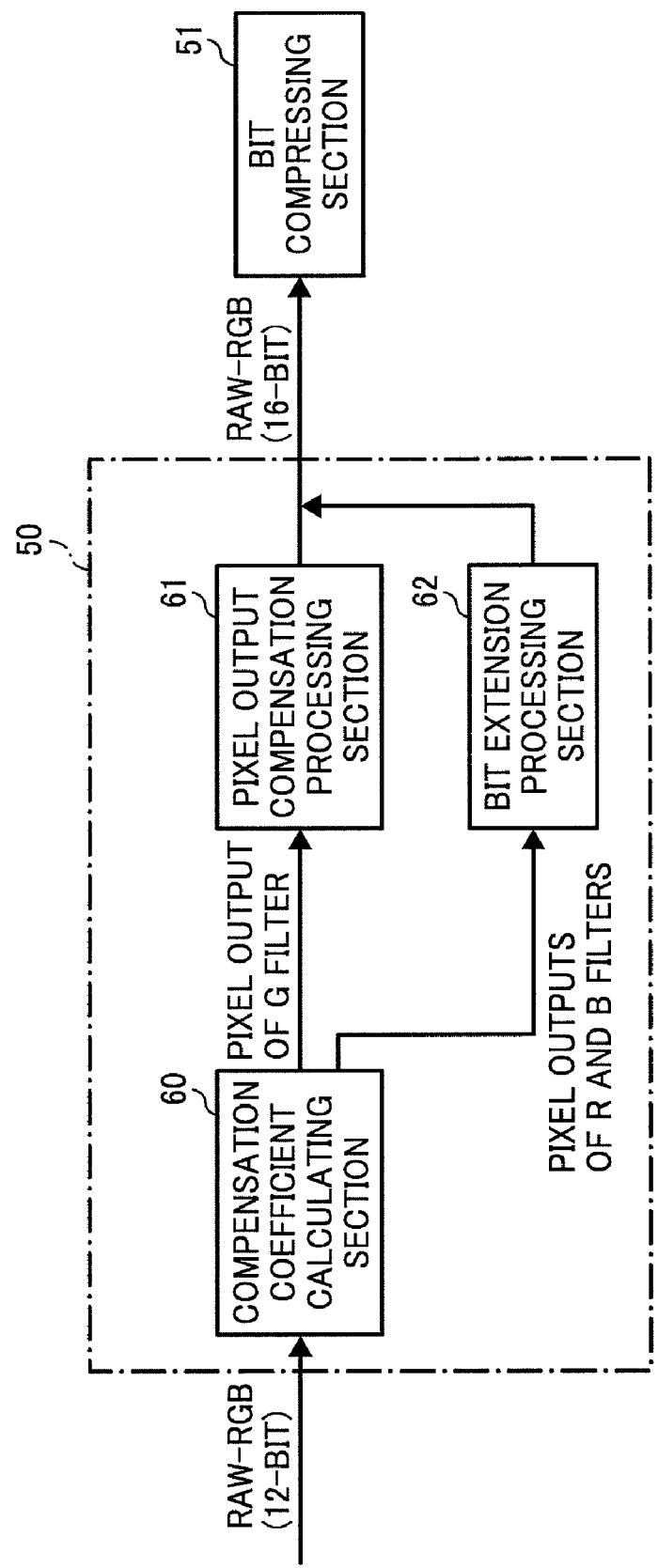
FIG. 20 is a block diagram illustrating a D range expansion compensating section and a bit compressing section of a YUV converting section in embodiment 5 of the present invention.

The pixel output value of the G filter becomes data which exceed a value of 12-bit data, therefore here the pixel output value of the G filter is once replaced by 16-bit data. Accordingly, maximum values of the pixel outputs of the R and B filters become 32760 (15-bit). Therefore, in the present embodiment, as illustrated in FIG. 20, each pixel output of the RGB filter replaced by 16-bit data is outputted from the D range expansion compensating section 50 to the bit compressing section 51.

In this case, in the present embodiment, the pixel output compensation processing section 61 of the D range expansion compensating section 50 replaces the pixel output value of the G filter calculated by the formulas (1) to (5) as the pixel output value in the processing unit.

And the pixel output of the G filter extended to 16-bit data is compressed to 12-bit data by the bit compressing section 51. And the pixel output values of the R and B filters are also compressed in accordance with a compression rate of the pixel output of the G filter. Hereinafter, a process similar to embodiment 1 is performed.

Thus, in the present embodiment, even when shooting as the pixel output of the G filter in the processing unit reaches the saturation level, relatively the sensitivities of the R and B filters can be lowered to approximately ⅛ of the sensitivity of the G filter by the second green color filter 70b which is moved on the optical axis of the photographing lens system 5. Therefore, the dynamic range is expanded 8 times at one shooting.

Embodiment 6

As described in embodiment 1, for example, when the pixel output of the G filter in the processing unit (see FIG. 7) reaches the saturation level A, as illustrated in FIG. 10A, the pixel outputs of the R and B filters which are in the vicinity of the G filter are often extremely small compared to the pixel output of the G filter. In this case, the compensation coefficient K=1 based on the formula (1), and substantially the compensating process of the pixel output of the G filter is not performed.

Therefore, in the present embodiment, in a case where the compensation coefficient K=1, for example, as illustrated in FIG. 14 of embodiment 2, the processing unit is enlarged compared to a case illustrated in FIG. 7 of embodiment 1. In this case, the pixel output of the G filter is compensated by the formulas (6) to (10).

Thus, according to the present embodiment, in a case where the pixel outputs of the R and B filters which are in the vicinity of the G filter are extremely small compared to the pixel output of the G filter, widening the processing unit in a case of the compensating process makes it possible to compensate the pixel output of the G filter by the pixel output of the R and B filters which are in a widened processing unit.

In a case where the processing unit is widened as in the above-described FIG. 14 and still the compensation coefficient K=1, for example, as illustrated in FIG. 15 of embodiment 3, the processing unit may be further widened. As illustrated in FIG. 15, in a case where the processing unit is further widened, a calculation used in embodiment 3 is used (a calculation where an average value of the pixel output of the G filter is calculated), so that a favorable compensating process can be performed.

In each of the above embodiments, a configuration where three primary color filters (Red, Green and Blue) as color separation filters are placed is used. However even if a configuration where complementary color filters as the color separation filters are placed is used, the present invention is applicable as well.

According to embodiments of the present invention, a pixel output of a pixel where a specific color filter is placed is compensated based on a pixel output of a pixel where another color filter is placed in the vicinity of the pixel where the specific color filter is placed and the pixel output of the pixel where the another color filter placed is less than its saturation level, and thereby a dynamic range is expanded. Therefore the dynamic range is expanded by a single shooting without performing a plurality of shootings with changing an exposure and making a composite image.

Additionally, by making a data compression rate of a pixel output for brightness where the pixel output of the pixel where the specific color filter is placed is less than its predetermined saturation level smaller than a data compression rate of the pixel output for brightness where the pixel output of the pixel where the specific color filter is placed reaches its predetermined saturation level, gradations are maintained favorably.

According to another embodiments of the present invention, when a pixel output of a pixel where a specific color filter is placed reaches its predetermined saturation level, the pixel output of the pixel where the specific color filter is placed is compensated based on a pixel output of a pixel where another color filter is placed in the vicinity of the pixel output of the pixel where the specific color filter is placed and the pixel output of the pixel where the another color filter is placed is less than its predetermined saturation level, and thereby a dynamic range is expanded. Therefore the dynamic range is expanded by a single shooting without performing a plurality of shootings changing an exposure and making a composite image.

Additionally, by making a data compression rate of a pixel output for brightness where the pixel output of the pixel where the specific color filter is placed is less than its predetermined saturation level smaller than a data compression rate of the pixel output for brightness where the pixel output of the pixel where the specific color filter is placed reaches its predetermined saturation level, gradations are maintained favorably.

According to further embodiments of the present invention, an average value is calculated by use of a pixel output of each pixel where at least two pixels of a same-color filter are placed in the vicinity of a pixel, and thereby a dispersion of an output value by a dispersion of a sensitivity of each pixel or the like is removed, therefore the dynamic range is expanded more accurately.

According to further embodiments of the present invention, inserting a same color filter as the specific color filter in a front side or in a back side of an optical system relatively lowers a sensitivity to brightness of the another color filter compared to a sensitivity to brightness of the specific color filter, therefore the dynamic range is further expanded easily.

According to further embodiments of the present invention, an expansion rate of the dynamic range is easily changed by a plurality of color filters having different light transmission rates respectively.

According to further embodiments of the present invention, an operation which compensates a pixel output of a pixel where the specific color filter is placed is selected by an operation selector, therefore the operation is performed by a judgment of a user.

According to further embodiments of the present invention, a compression rate to become approximately a same value before and after performing a bit compression is used for the pixel output for brightness where the pixel output of the pixel where the specific color filter is placed is less than its saturation level and is low, therefore gradations in the low brightness level are maintained favorably.

According to further embodiments of the present invention, when a pixel output of a pixel where another color filter is placed in the vicinity of the pixel where the specific color filter is placed is significantly smaller compared to the pixel output of the pixel where the specific color filter is placed, a problem such that the pixel output of the pixel where the specific color filter is placed becomes smaller than the pixel output before the compensating process occurring by a compensating process is prevented, therefore the dynamic range is prevented from becoming small.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus, comprising:
    an image sensor having a light receiving surface with a plurality of pixels and a color separation filter of a plurality of colors placed on a front side of the pixels, which receives light from a photographic subject which is incident via an optical system on the light receiving surface via the color separation filter, outputs a pixel output of each pixel, and images an image of the photographic subject;
    a pixel output judging section which judges if each pixel output reaches each predetermined saturation level or not;
    a pixel output compensation processor which performs a compensating process that calculates a pixel output of a pixel where a color separation filter of a specific color is placed, and expands a dynamic range of the image which the image sensor images, based on a pixel output of a pixel where another color separation filter is placed in a vicinity of the pixel where the color separation filter of the specific color is placed and the pixel output of the pixel where the another color separation filter is placed is less than its predetermined saturation level; and
    a bit compression convertor which has a bit compression conversion characteristic in which a data compression rate of a pixel output for brightness where the pixel output of the pixel where the color separation filter of the specific color is placed is less than its predetermined saturation level is smaller than a data compression rate of the pixel output for brightness where the pixel output of the pixel where the color separation filter of the specific color is placed reaches its predetermined saturation level, and converts data of the pixel output converted to a second bit number which is larger than a first bit number from the first bit number to the first bit number again based on the bit compression conversion characteristic.

2. The imaging apparatus according to claim 1, wherein the compensating process is performed in a case where the pixel output judging section judges that the pixel output of the pixel where the color separation filter of the specific color is placed reaches its predetermined saturation level.

3. The imaging apparatus according to claim 1, wherein in a case where the pixel output of the pixel where the another color separation filter is placed in the vicinity of the pixel where the color separation filter of the specific color is placed exceeds a predetermined output level, the pixel output compensation processor performs the compensating process.

4. The imaging apparatus according to claim 1, wherein in a case where the pixel output judging section judges the pixel output, a processing unit is an area comprising 2×2 pixels in horizontal and vertical directions.

5. The imaging apparatus according to claim 1, wherein in a case where there are a plurality of pixels where same color filters are placed in a predetermined range, a value of the pixel output where the same color filters are placed is an average value of the pixels where the same color filters are placed.

6. The imaging apparatus according to claim 1, wherein on an optical axis of the optical system, a color filter of a same color as the color separation filter of the specific color which is movable is provided, so that a sensitivity of the another color separation filter is relatively lowered compared to a sensitivity of the color separation filter of the specific color.

7. The imaging apparatus according to claim 6, wherein plural pieces of the color filter are provided and each color filter has a different light transmission rate.

8. The imaging apparatus according to claim 1, further comprising:
    an operation selector which is configured to select and execute the compensating process.

9. The imaging apparatus according to claim 1, wherein the bit compression conversion characteristic has a compression rate such that data of the pixel output before converting is an approximately same value as data of the pixel output after converting, in a case of brightness such that the pixel output of the pixel where the color filter of the specific color is placed becomes less than its predetermined saturation level and is low.

10. The imaging apparatus according to claim 1, wherein in a case where the pixel output of the color separation filter of the specific color after the compensating process is larger than the pixel output before the compensating process, the pixel output compensation processor uses the pixel output after the compensating process as the pixel output of the color separation filter of the specific color.

11. An imaging method, comprising:
    a step of preparing an imaging apparatus, including: an image sensor having a light receiving surface with a plurality of pixels and a color separation filter of a plurality of colors placed on a front side of the pixels, which receives light from a photographic subject which is incident via an optical system on the light receiving surface via the color separation filter, outputs a pixel output of each pixel, and images an image of the photographic subject;

a step of a pixel output judgment which judges if each pixel output reaches each predetermined saturation level or not;

a step of a pixel output compensation process which performs a compensating process that calculates a pixel output of a pixel where a color separation filter of a specific color is placed, and expands a dynamic range of the image which the image sensor images, based on a pixel output of a pixel where another color separation filter is placed in a vicinity of the pixel where the color separation filter of the specific color is placed and the pixel output of the pixel where the another color separation filter is placed is less than its predetermined saturation level; and a step of a bit compression conversion which has a bit compression conversion characteristic in which a data compression rate of a pixel output for brightness where the pixel output of the pixel where the color separation filter of the specific color is placed is smaller than a data compression rate of the pixel output for brightness where the pixel output of the pixel where the color separation filter of the specific color is placed reaches its predetermined saturation level, and converts data of the pixel output converted to a second bit number which is larger than a first bit number from the first bit number to the first bit number again based on the bit compression conversion characteristic.

12. The imaging method according to claim 11, wherein the compensating process is performed in a case where the step of the pixel output judgment judges that the pixel output of the pixel where the color separation filter of the specific color is placed reaches its predetermined saturation level.

13. The imaging method according to claim 11, wherein in a case where the pixel output of the pixel where the another color separation filter is placed in the vicinity of the pixel where the color separation filter of the specific color is placed exceeds a predetermined output level, the step of the pixel output compensation process performs the compensating process.

14. The imaging method according to claim 11, wherein in a case where the step of the pixel output judgment judges the pixel output, a processing unit is an area comprising 2×2 pixels in horizontal and vertical directions.

15. The imaging method according to claim 11, wherein in a case where there are a plurality of pixels where same color filters are placed in a predetermined range, a value of the pixel output where the same color filters are placed is an average value of the pixels where the same color filters are placed.

16. The imaging method according to claim 11, wherein on an optical axis of the optical system, a color filter of a same color as the color separation filter of the specific color which is movable is provided, so that a sensitivity of the another color separation filter is relatively lowered compared to a sensitivity of the color separation filter of the specific color.

17. The imaging method according to claim 16, wherein plural pieces of the color filter are provided and each color filter has a different light transmission rate.

18. The imaging method according to claim 11, further comprising:
a step of preparing an operation selector which is configured to select and execute the compensating process.

19. The imaging method according to claim 11, wherein the bit compression conversion characteristic has a compression rate such that data of the pixel output before converting is an approximately same value as data of the pixel output after converting, in a case of brightness such that the pixel output of the pixel where the color filter of the specific color is placed becomes less than its predetermined saturation level and is low.

20. The imaging method according to claim 11, wherein in a case where the pixel output of the color separation filter of the specific color after the compensating process is larger than the pixel output before the compensating process, the step of the pixel output compensation process uses the pixel output after the compensating process as the pixel output of the color separation filter of the specific color.

* * * * *